Oct. 19, 1943.   H. G. ALLEN   2,332,187
AUTOMATIC BAG FEEDER
Filed July 25, 1940   14 Sheets-Sheet 1

INVENTOR
Howard G. Allen
BY
ATTORNEY

Oct. 19, 1943.                H. G. ALLEN                2,332,187
                          AUTOMATIC BAG FEEDER
                     Filed July 25, 1940        14 Sheets-Sheet 4

INVENTOR
Howard G. Allen
BY
ATTORNEY

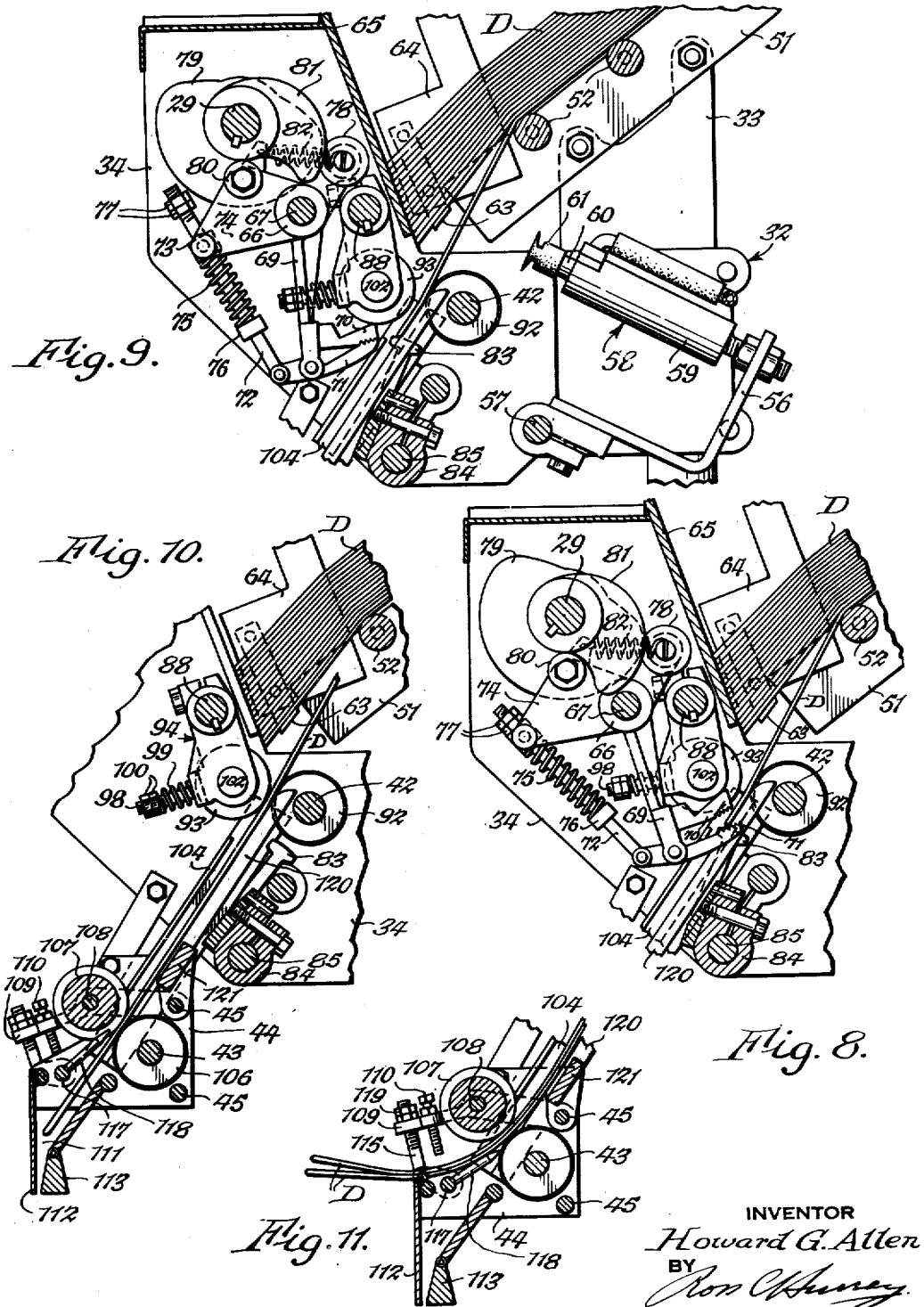

Oct. 19, 1943. H. G. ALLEN 2,332,187
AUTOMATIC BAG FEEDER
Filed July 25, 1940 14 Sheets-Sheet 6

INVENTOR
Howard G. Allen
BY
ATTORNEY

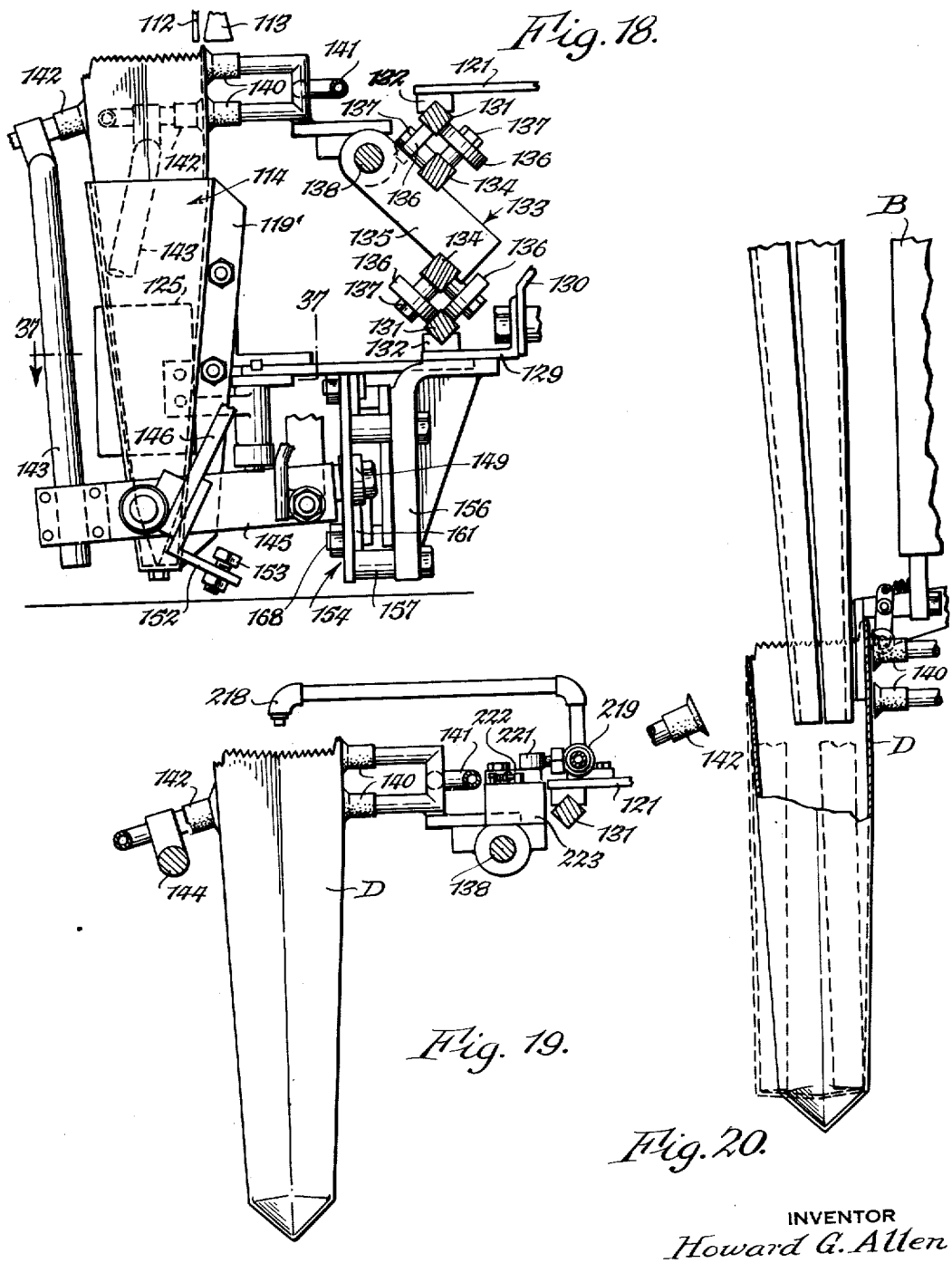

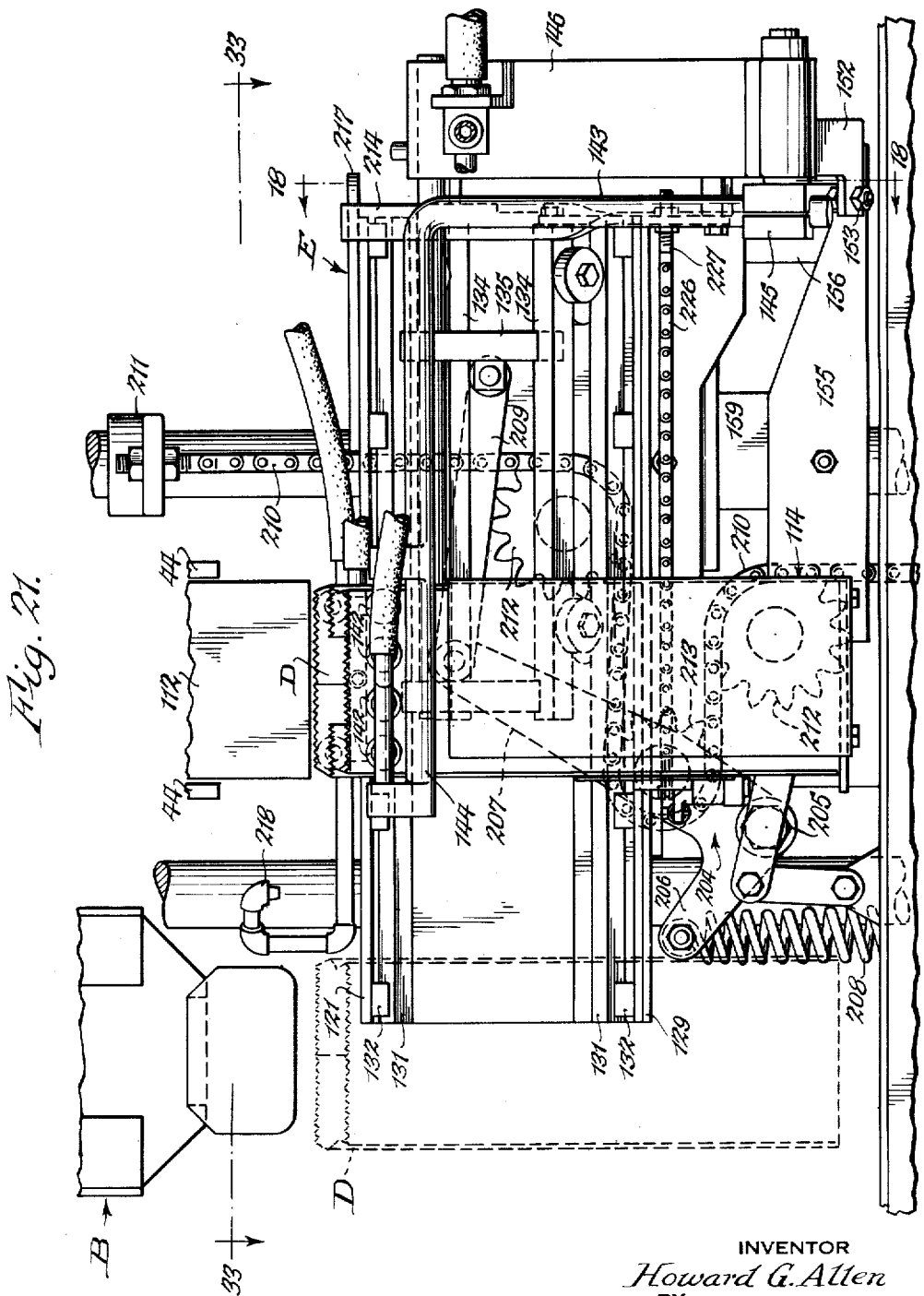

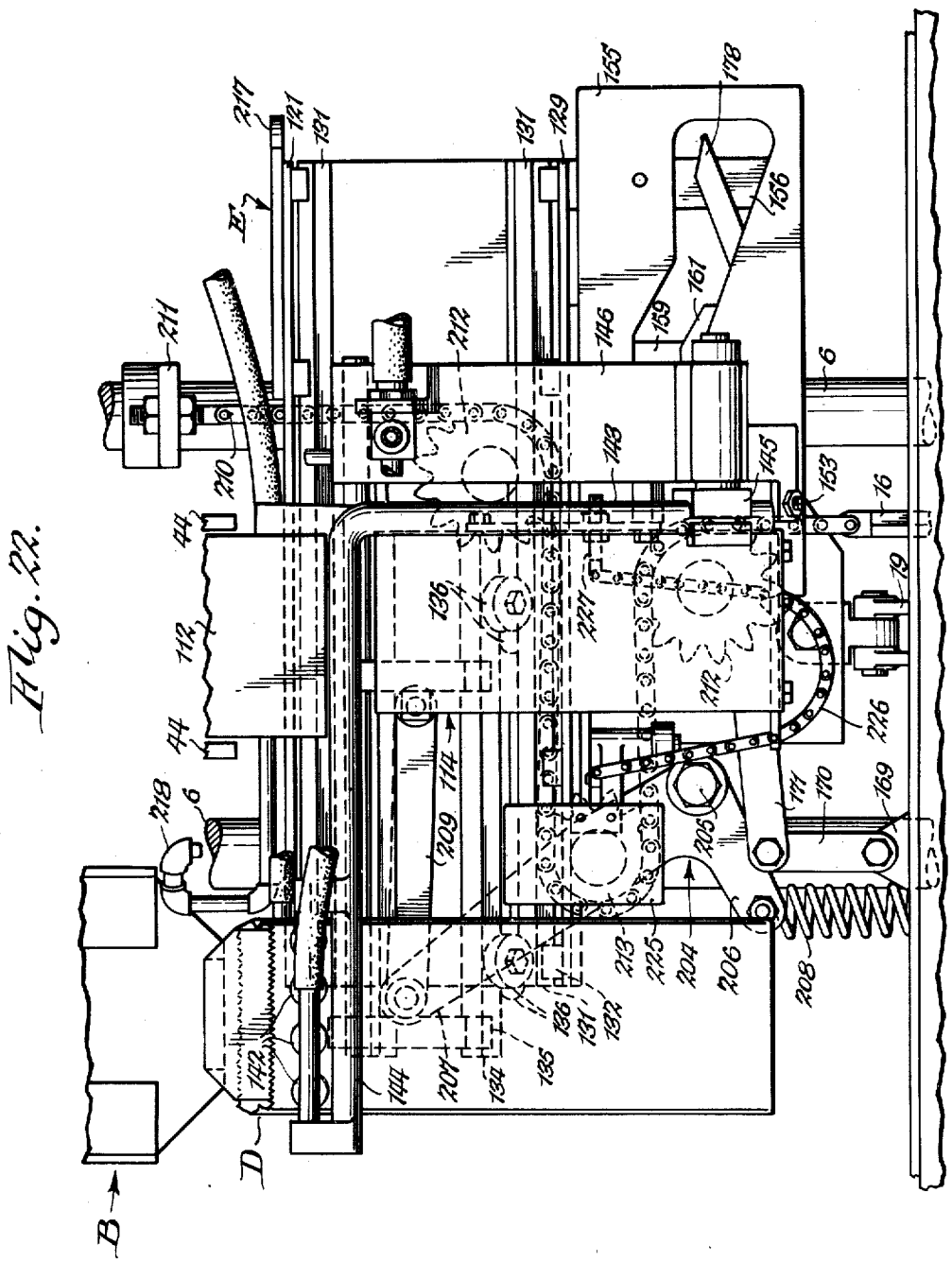

Oct. 19, 1943.    H. G. ALLEN    2,332,187
AUTOMATIC BAG FEEDER
Filed July 25, 1940    14 Sheets-Sheet 10

INVENTOR
Howard G. Allen
BY
ATTORNEY

Oct. 19, 1943.           H. G. ALLEN           2,332,187
AUTOMATIC BAG FEEDER
Filed July 25, 1940           14 Sheets-Sheet 11

INVENTOR
Howard G. Allen
BY
ATTORNEY

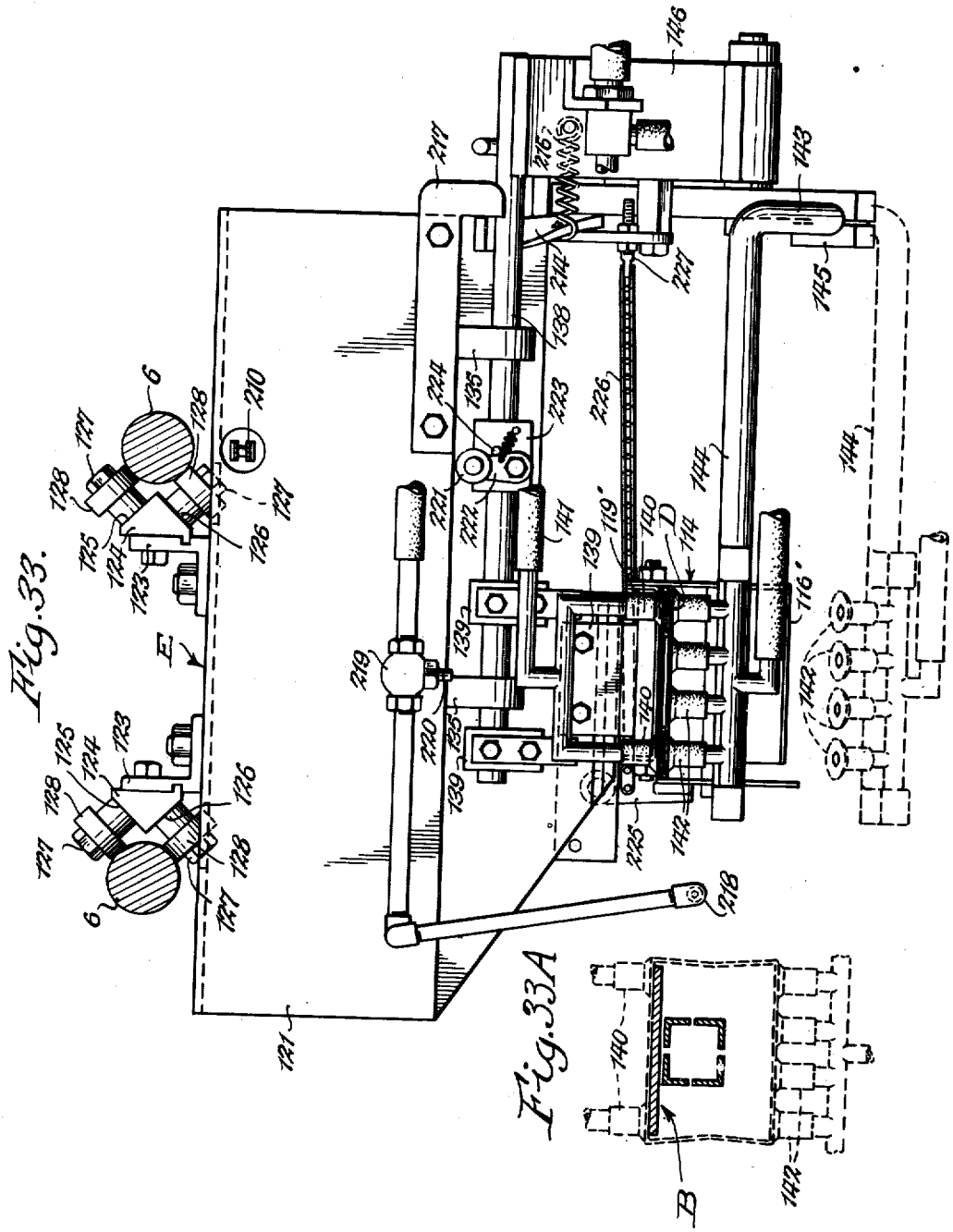

Oct. 19, 1943.     H. G. ALLEN     2,332,187
AUTOMATIC BAG FEEDER
Filed July 25, 1940     14 Sheets-Sheet 13

INVENTOR
Howard G. Allen
BY
ATTORNEY

Prtented Oct. 19, 1943

2,332,187

UNITED STATES PATENT OFFICE 2,332,187

AUTOMATIC BAG FEEDER

Howard G. Allen, Niagara Falls, N. Y., assignor to Consolidated Packaging Machinery Corporation, Buffalo, N. Y., a corporation of New York Application July 25, 1940, Serial No. 347,378

31 Claims. (Cl. 226—47)

This invention relates to new and useful improvements in article-handling devices and particularly seeks to provide a novel machine for automatically feeding paper bags from a supply stack to an opening and filling machine.

Heretofore various forms of bag-handling devices have been developed which were so designed and constructed as to be an integral part of a bag-filling machine or the like. Naturally bag-handling devices of this nature are limited in the uses to which they can be put by the limits of the machine with which they are combined. Thus a bag-filling machine designed for use in conjunction with a particular type of bag includes bag-feeding and handling means adapted for use with that type of bag only, and cannot therefore be used in handling other types of bags.

This invention provides novel bag-feeding and handling means which forms a complete and unitary structure capable of being used in conjunction with a number of bag opening and/or filling machines and which is readily adaptable for use with bags of various sizes and types, but which does not form an integral part of such opening and filling machines.

Therefore an object of this invention is to provide a fully automatic bag feeding machine which may be employed to feed bags from a supply stack to the bag receiving station of any opening and filling machine with which it is associated.

Another object of the invention is to provide a machine of the character stated which may be readily adjusted to handle bags of different sizes.

Another object of the invention is to provide a machine of the character stated that is capable of uniformly feeding bags at a high rate of speed.

Another object of the invention is to provide a machine of the character stated that will withdraw a single bag from a supply stack, partially open the mouth thereof, transfer the partially opened bag from the station adjacent the supply stack to the bag receiving station of the associated opening and filling machine, and raise the partially opened bag into engaging relation with the bag opening devices of said opening machine.

Another object of the invention is to provide a machine of the character stated which includes ejecting mechanism effective to reject any bags withdrawn from the supply stack more than one at a time.

Another object of the invention is to provide a machine of the character stated which employs novel bag transfer means including a carriage laterally reciprocable between the supply station and the opening station of the associated opening machine, and vertically reciprocable at the opening station of the associated opening machine to automatically apply a bag to the opening devices thereof.

With these and other objects in view, the nature of which will become more apparent, the invention will be more fully understood by reference to the drawings, the accompanying detailed description, and the appended claims.

In the drawings:

Fig. 8 is a vertical section taken on line 8—8 of Fig. 7 and shows the second step in withdrawing a bag from the stack;

Fig. 9 is a view similar to Fig. 8, but shows the upper feed rolls coming into engagement with the bag end;

Fig. 10 is a view similar to Figs. 8 and 9, but shows the bag engaged by the feed rolls;

Fig. 11 is a detail section of the lower portion of the mechanism disclosed in Fig. 10 and shows the ejection of two superposed bags;

Fig. 18 is a somewhat fragmentary vertical section taken on line 18—18 of Fig. 21;

Fig. 19 is a view of the general nature of Fig. 18, but showing only the suction cup assembly;

Fig. 20 is a fragmentary detail section showing the bag clamped to the bag opener of the associated opening machine;

Fig. 21 is a fragmentary longitudinal vertical section taken on line 21—21 of Fig. 1, looking towards the front of the machine, and showing the carriage in its retracted position;

Fig. 22 is a view similar to Fig. 21, but showing the carriage in its fully translated position;

Fig. 33 is a horizontal section taken on line 33—33 of Fig. 21;

Fig. 33A is a sectional view in detail showing the bag in expanded condition.

Figures 1, 3, 4, 5:
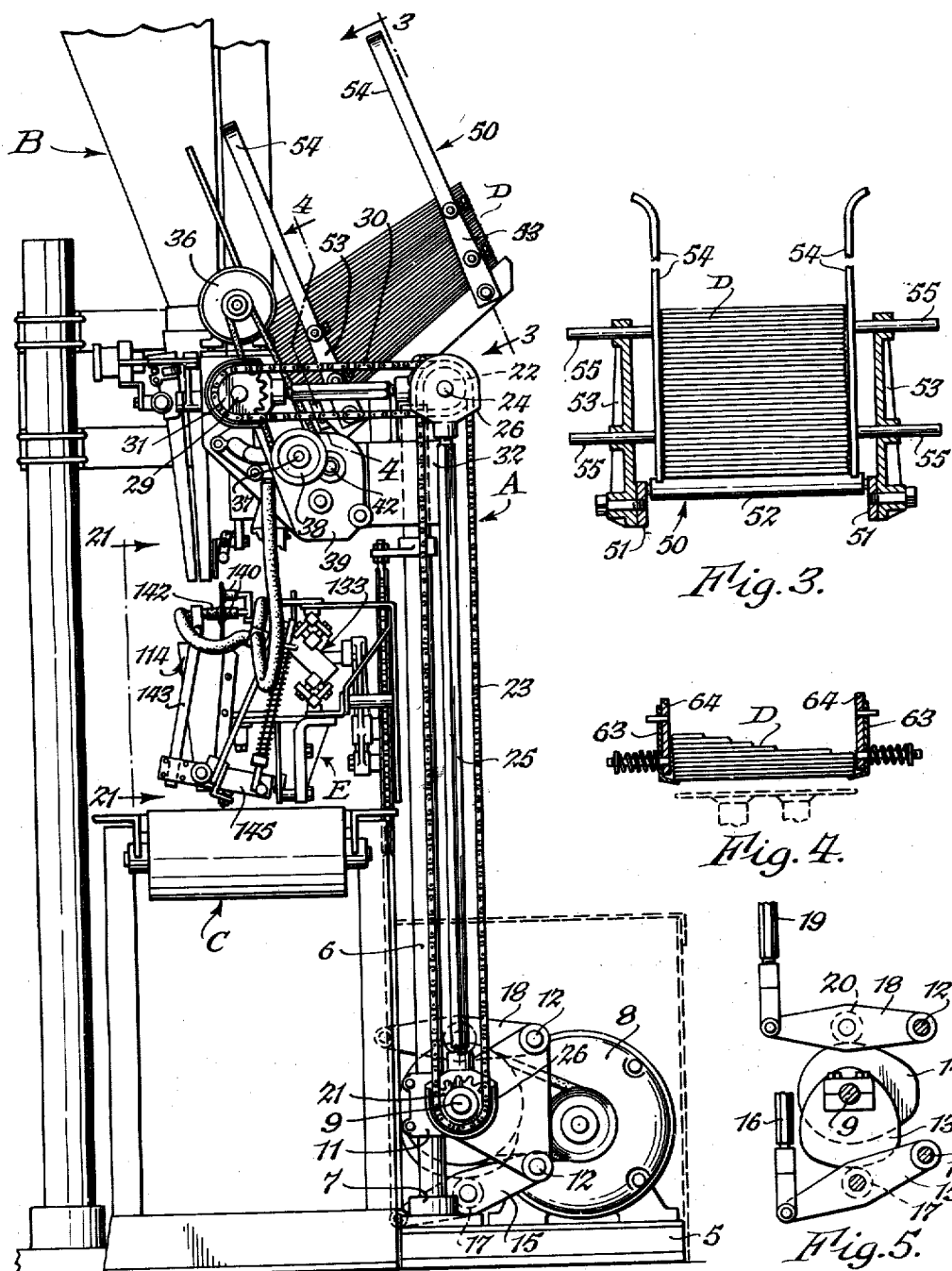
Fig. 1 is a side elevation of an automatic bag feeding machine constructed in accordance with this invention, the bag filling machine and conveyor associated therewith being somewhat diagrammatically indicated in their correct relative positions.
Fig. 3 is a detail section of the stack holder taken on line 3—3 of Fig. 1.
Fig. 4 is a similar section taken on line 4—4 of Fig. 1.
Fig. 5 is a vertical section taken on line 5—5 of Fig. 2, certain of the machine parts being omitted.
Figure 2:
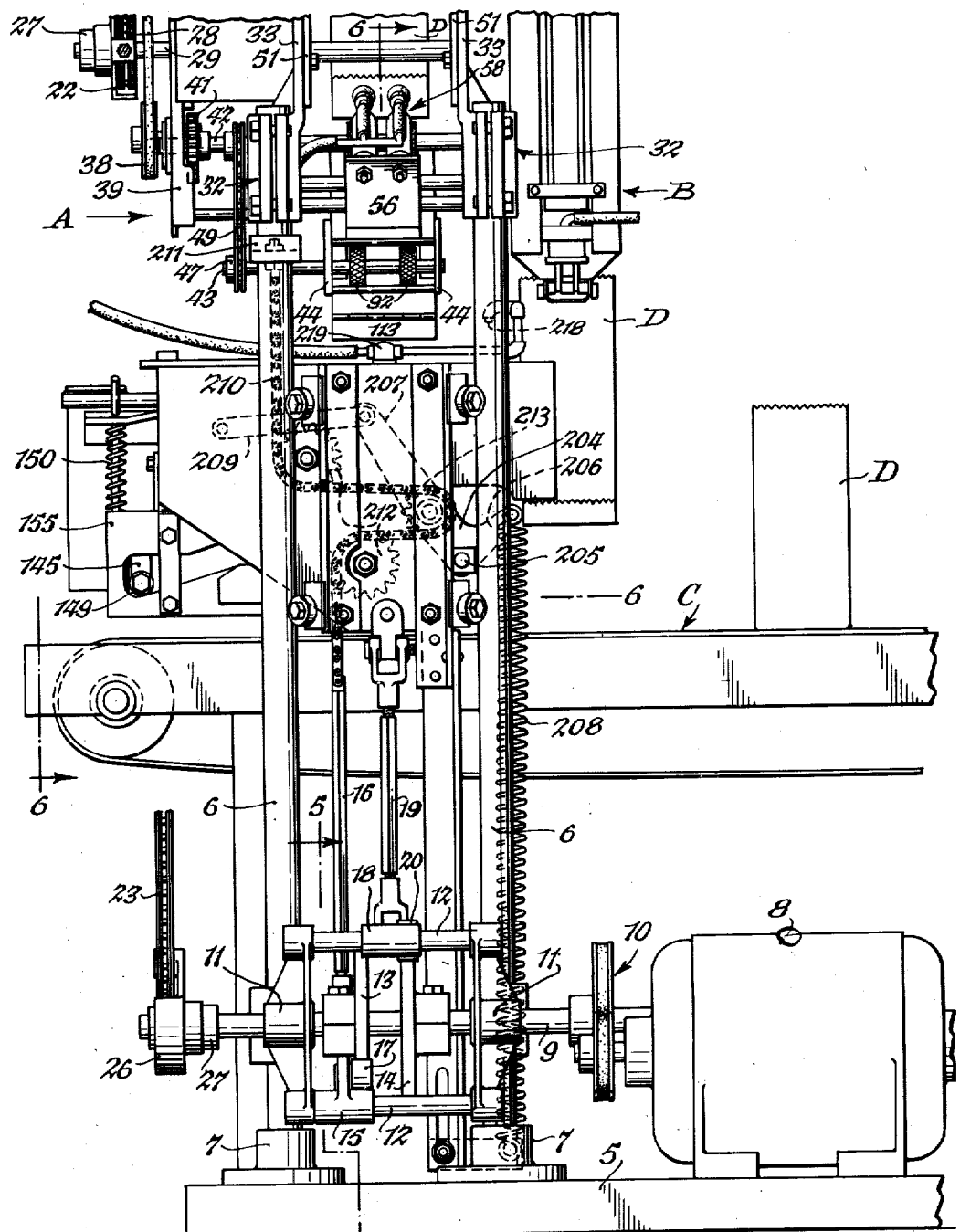
Fig. 2 is a front elevation of the machine.

Referring to the drawings in detail the invention as illustrated is embodied in an automatic bag feeding machine A which is adapted to be positioned in cooperative relationship to a bag opening and filling machine indicated at B and a conveyor unit indicated at C for carrying off the filled bags (see Figs. 1 and 2).

In order that the structure and operation of the bag feeding machine A may be more clearly understood, the description thereof will be presented in four phases, namely, the mounting means and driving connections, the bag feeding mechanism, the bag cradle and transfer mechanism, and the operation of the machine as a whole.

*Mounting means and driving connections*

The bag feeding machine in which this invention is embodied is supported as a whole on a generally rectangular base 5. A pair of standards 6 are mounted on one end of the base and are rigidly secured thereto through the use of flanged sockets 7. The standards 6 support all of the driven mechanisms of the machine. A motor 8 is mounted on the base and drives a horizontal cam shaft 9 through the medium of speed reducing belt or other drive generally indicated at 10. The shaft 9 is journaled in spaced bearings 11 adjustably mounted on the respective standards 6 and are rigidly maintained in alignment by a pair of vertically separated spacer bars 12—12 secured therebetween.

A pair of bag transfer cradle actuating cams 13 and 14, respectively, are adjustably secured to the cam shaft 9 in spaced relation and are disposed intermediate the bearings 11. A rock arm 15 has one end trunnioned on the lower spacing rod 12 and its other end pivotally connected to a vertically disposed link 16 connecting the rock arm with carriage transversing mechanism to be hereinafter more fully described. The rock arm 15 is provided with a roller cam follower 17 mounted intermediate the ends thereof and engageable with the cam 13. A second rock arm 18 has one end trunnioned on the upper spacing rod 12 and its other end pivotally connected to a vertically disposed link 19 connected to the rock arm and the carriage supporting devices to provide vertical reciprocation thereto, as will be hereinafter more fully described. The rock arm 18 is provided with a roller cam follower 20 mounted intermediate the ends thereof and engageable with the cam 14.

One projecting end of the cam shaft 9 is provided with a sprocket gear 21 which drives a second sprocket gear 22 through an endless sprocket chain 23. The sprocket gear 22 is fixed to a shaft 24 journaled in a bracket forming part of the bag feeding mechanism A and secured to the upper ends of the standards 6. The sprocket gears 21 and 22 are restrained from gyrations through the use of a spacer bar 25, the ends of which are provided with housings indicated at 26 and which are carried by the respective shafts 9 and 24, the shafts being freely rotatable relative thereto. Axial displacement of the respective housings 26 is prevented since the housings are retained between the respective sprocket gears and collars 27 fixed to the shafts with which the housings are associated.

The shaft 24 is also provided with another sprocket gear 28 rigidly secured thereto. The sprocket gear 28 drives a main cam shaft 29 of the bag feeding mechanism through the medium of an endless sprocket chain 30 and associated sprocket gear 31 secured to the shaft.

A pair of feed mechanism supporting brackets 32—32 is adjustably secured to the upper ends of the respective standards 6, and each includes an upstanding panel portion 33 and a rearwardly extending panel portion 34. The rearwardly extending portions 34 are maintained in spaced parallel relation through the use of spacer bars, the locations of which will be hereinafter more fully described. The main cam shaft 29 is journaled in the panel portions 34 of the brackets 32 and positioned adjacent the upper ends thereof.

The panel portions 34 are further reinforced by a plate 35 spanning the space therebetween and secured to the upper edges thereof. The plate 35 supports a small motor 36 which drives a short shaft 37 located therebelow through the medium of pulley and belt connections generally indicated at 38. The shaft 37 is journaled at one end in one rear extension 34 of the mounting bracket 32 and at its other end in a bracket 39 rigidly secured and laterally spaced from one bracket 32.

Figures 16, 17:
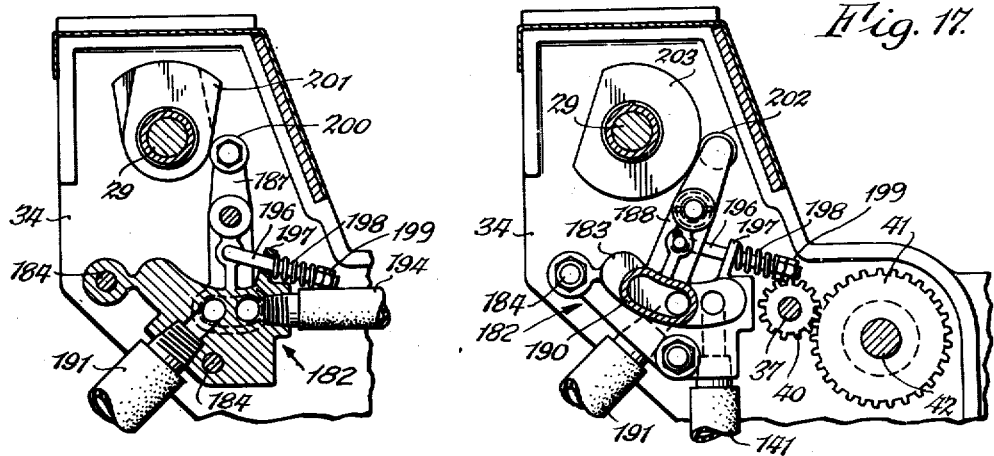
Fig. 16 is a vertical section taken on line 16—16 of Fig. 7.
Fig. 17 is a vertical section taken on line 17—17 of Fig. 7.

A small pinion gear 40 (see Fig. 17) is fixed to the shaft 37 and meshes with a larger gear 41 fixed to an upper feed roll mounting shaft 42 journaled in the bracket portions 34 and disposed in front and slightly below the shaft 37. A lower feed roll shaft 43 is journaled in a pair of brackets 44—44 dependably secured to the lower portions of the rear extensions 34 and maintained in rigid spaced relation by spacing elements 45 and centering elements 46. The shaft 43 is provided with a sprocket gear 47 rigidly secured thereto and driven from a sprocket gear 48 rigidly secured to the shaft 42 through the use of an endless sprocket chain 49.

Bag feeding mechanism

The entirety of the mechanism for feeding bags singly from the supply stack of the transfer cradle is carried by the brackets 32 and the bracket extensions associated therewith.

A bag magazine generally indicated at 50 is mounted on the brackets 32. The magazine 50 includes a pair of spaced parallel stringers 51, 51, respectively secured to the upstanding portions 33 of the brackets 32 and are inclined upwardly. A plurality of rollers 52 are journaled in the stringers 51 and are disposed in spaced parallel relation along the length thereof to thereby provide supporting means for a stack of bags generally indicated at D. The sides of the magazine 50 are formed from pairs of opposed upwardly projecting standards 53 secured to the stringers 51. Each standard 53 supports a stack confining strap or bar 54 adjustably mounted thereon through the medium of relatively long spaced pins 55, 55 which are axially slidable in the standard with which they are associated. Thus the bag confining straps 54 are movable towards and away from each other to accommodate bags of different widths. It should be noted that the lower ends of the bags supported in the magazine 50 project beyond the lowermost supporting roller 52 in order that the bag ends may be individually engaged by feeding devices.

In Figs. 6, 8, 9 and 10 of the drawings there are illustrated the steps of and mechanism for removing a bag D from the magazine 50 to the bag transfer cradle. The feeding means includes a bracket 56 adjustably clamped to a transverse rod 57 which forms one of the spacing elements maintaining the brackets 32 in parallel relation. The bracket 56 supports a suction cup bag selector 58 for withdrawing the end of the bottom bag in the stack into position to be engaged by gripper jaws, and which includes a cylinder 59 in which a hollow rod 60 is slidably mounted. The rod is normally held within the cylinder by the action of a coil spring (not shown) and the outer end of the rod is provided with a suction cup 61. Air is exhausted from the cylinder 59 through an outlet 62 located adjacent that end of the cylinder from which the rod 60 projects, thereby creating a vacuum within the cylinder of a magnitude sufficient to overcome the action of the spring and thereby project the rod 60 outwardly until the suction cup 61 thereof contacts the bottom bag of the stack. This closes the opening in the rod and equalizes the vacuum within the cylinder so that the spring is again effective to retract the rod into this cylinder, thereby drawing the bag end away from the stack. The application of suction to the selector 58 is controlled by valve mechanisms actuated by travel of the bag transfer carriage and which will be later described in detail. It is of course obvious that more than one selector 58 may be employed if desired.

The lower ends of the bags in the stack are normally prevented from dropping by spring clips 63 resiliently mounted on wing portions 64 of the bag magazine 50. The wing portions 64 are used to retain the lower ends of the stacked bag in proper lateral alignment. The stacked bags are maintained in proper vertical alignment through the use of an abutment plate 65 against which the ends thereof rest.

Before the rod 60 of the bag selector reaches fully retracted position, a gripper device is brought into engagement with the bag end preparatory to moving the bag into engagement with feed rolls. The gripper includes a bell crank 66 pivotally mounted on a bar 67 which also forms one of the spacing elements between the rear extensions 34 of the brackets 32. The bell crank is provided with an upstanding short arm 68 and a relatively long arm 69 having a laterally extending gripper jaw 70 rigidly secured thereto or formed integral therewith. The arm 69 also carries a movable gripper jaw 71 pivotally connected thereto at a point intermediate its ends and which is adapted to cooperate with the stationary jaw 70 to grip the end of a bag presented therebetween. The other end of the movable jaw 71 is pivotally connected to the lower end of a rod 72. The upper end of the rod 72 is slidably engaged in a block 73 pivotally secured to one base apex point of a generally triangular shaped plate 74. The other base apex point of the plate 74 is pivotally mounted on the rod 67. A compression spring 75 is mounted on the rod 72 and interposed between the block 73 and an abutment annulus 76 secured to the rod near the lower end thereof. The upper end of the rod 72 is prevented from disengagement with the block 73 by nuts 77 threadably engaged thereon.

The arm 68 of the bell crank is provided with a roller cam follower 78 engageable with an actuating cam 79 secured to the main cam shaft 29 to thereby provide oscillation of the gripper jaw assembly. Movement of the gripper jaw 71 relative to the stationary jaw 70 is effected through a roller cam follower 80 mounted on the triangular plate 74 and engageable with a cam 81 secured to the main cam shaft 29. Positive contact of the cam followers with the cams 79 and 81 is assured by provision of a tension spring 82 connecting the plate 74 and the end of arm 68, thus holding the bell crank 66 and the triangular plate 74 as a unit in any position to which they are moved by the cams.

Figure 6:
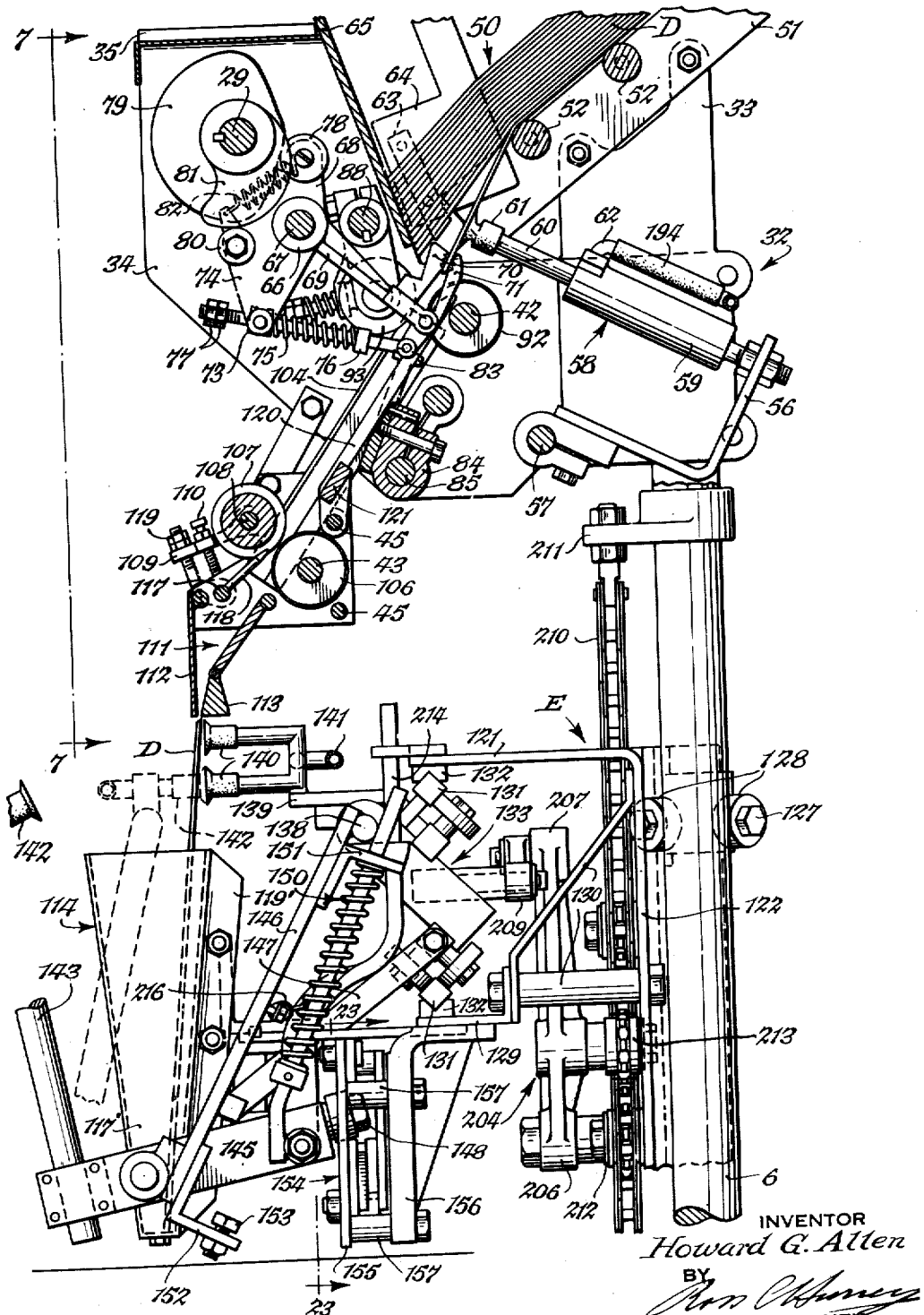
Fig. 6 is a transverse vertical section taken on line 6—6 of Fig. 2.

In the position shown in Fig. 6 the cam follower 78 is riding the lower portion of the cam 79, while the cam follower 80 is riding the highest portion of the cam 81. In this position the cam 79 functions merely as a stop to limit upward swing of the gripper jaws, while the cam 81 swings the gripper jaws upwardly and then causes additional movement of the triangular plate 74 to push the rod 72 downwardly through the medium of the compression spring 75 to thereby pivot the movable jaw 71 to the bag clamping position. Thus it is readily apparent that the tension spring 82 connecting the triangular plate 74 and the arm 68 of the bell crank permits differential movement therebetween which is effective to actuate the movable gripper jaw 71. After the bag has been gripped the cam 79 turns the bell crank 66 clockwise to move the gripper jaws and the bag held therebetween downwardly into engagement with a stop 83. At this stage of the cycle the follower 80 has ridden off the high lift portion of the cam 81 and is drawn into engagement with the concave portion thereof thereby moving the swivel block 73 into engagement with the nuts 77 on the rod 72, and draws the rod upwardly against the spring 75 to open the gripper (see Fig. 8). Continued rotation of the cam 79 moves the arm 69 of the bell crank to the position shown in Fig. 9 where the cam follower 80 rides the lowest lift portion of cam 81 and the gripper jaws are again closed.

Figure 7:
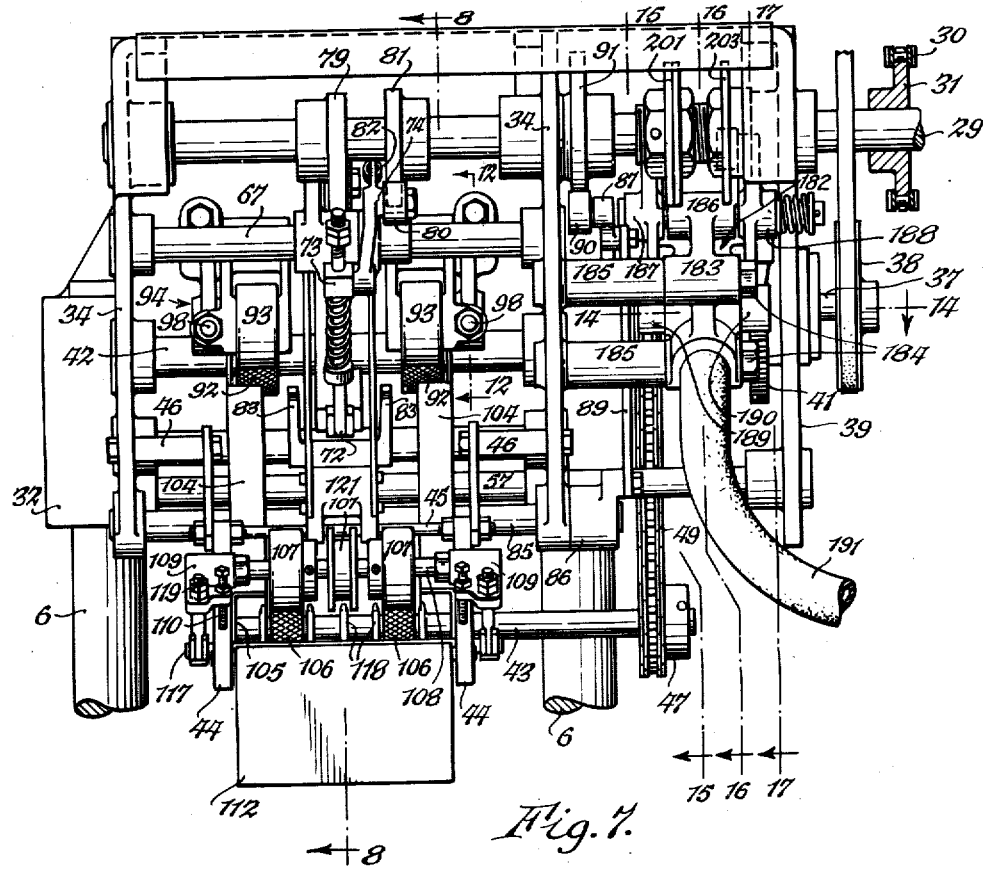
Fig. 7 is a longitudinal vertical section taken on line 7—7 of Fig. 6 and looking towards the front of the machine.
Figure 15:
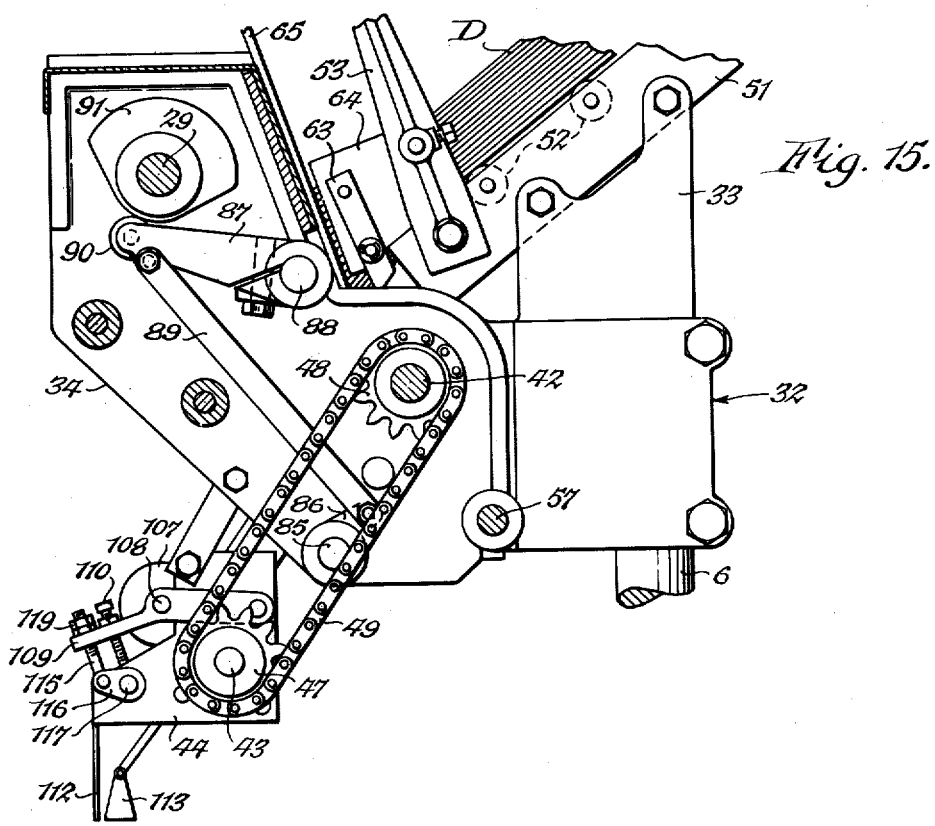
Fig. 15 is a vertical section taken on line 15—15 of Fig. 7.

During the retraction of the gripper after the bag has been released therefrom, the bag remains registered against the stop 83. The stop comprises a generally U-shaped stop element having the stop arms 83 formed integral therewith and extending upwardly in spaced parallel relation. The stop is fixed to a mounting boss 84 adjustably secured to a shaft 85 journaled in the rear extensions 34 of the main mounting brackets. One end of the shaft 85 projects beyond its associated bracket extension 34 and is provided with a short lever 86 secured thereto (see Figs. 7 and 15). A second lever arm 87 of greater length than the arm 86 is secured to a shaft 88 journaled in the extensions 34 and is connected to the arm 86 by a link 89 joining the ends of the arms. The extreme end of the lever 87 is provided with a roller cam follower 90 engageable with a cam 91 secured to the main cam shaft 29. The shaft 85 is thus oscillated by the cam follower and link connections described to thereby swing the stop fingers 83 into and out of the path of travel of a bag entering engagement with the feed rolls.

Figures 12, 13:
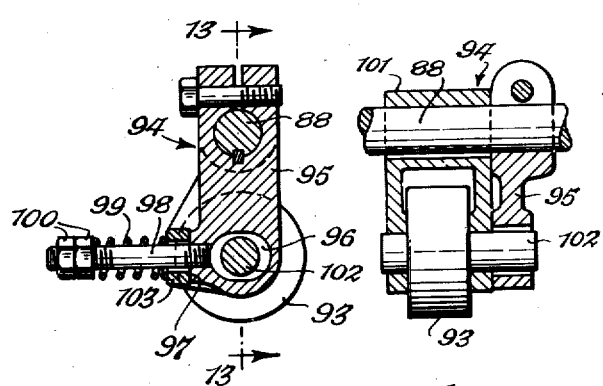
Fig. 12 is a detail vertical section taken on line 12—12 of Fig. 7.
Fig. 13 is a vertical section taken on line 13—13 of Fig. 12.

A pair of knurled feeding rolls 92, 92 are secured to the shaft 42 in spaced relation and so disposed as to contact longitudinal edge portions of a bag presented thereto from the stack, and are opposed by a pair of idle rolls 93, 93 adapted to be brought into engagement therewith. The idle rolls 93 are journaled in bracket assemblies generally indicated at 94 which are secured to the shaft 88 journaled in the rear bracket extensions 34. Each bracket assembly 94 includes a bracket arm 95 (see Figs. 12 and 13), rigidly affixed to the shaft 88 and having an elongated aperture 96 formed adjacent the end thereof. An abutment shoulder 97 is formed adjacent the end of one side of the bracket arm and is provided with a stud 98 extending laterally therefrom. A compression spring 99 is mounted on the stud and retained thereon by nuts 100. A second bracket arm 101 is freely mounted on the shaft 88 and retained in a position adjacent the arm 95 as by a collar or other means, not shown. The bracket 101 carries a short shaft 102 which rotatably supports the idle roll 93, and one end of which projects into the aperture 96 of the arm 95. The bracket 101 is provided with an arm 103 extending in a direction parallel to the axis of the shaft 88, and the end of which fits over the stud 98 and is disposed intermediate the spring 99 and the abutment shoulder 97. Through the use of the mounting means as described for the idle rolls 93 the idle rolls are provided with some degree of self-adjustment to avoid any damaging pinching of the bag paper and to permit passage of any "double deckers" to detecting and ejecting means, the nature of which will be hereinafter described. The spring 99 is normally adjusted to hold the arm 103 against the abutment shoulder 97 and thereby maintain the shaft 102 centrally disposed in the aperture 96. The two bracket arms 95 and 101 normally move as a single unit, and relative movement therebetween takes place only when some abnormal situation arises, such as the presentation of "double decker" bags to the feed rolls.

The cam and follower connections 90 and 91 which actuate the stop 83 also effect oscillation of the shaft 88 in timed relation thereto to bring the idle rolls 93 into and out of engagement with the driven rolls 92 for timed feeding operations.

The bag is thus fed by the upper set of feed rolls 92, 93 to a lower set of feed rolls located to present the bag to the bag traversing cradle assembly. As a bag leaves the upper feed rolls the longitudinal edges thereof are supported in grooved portions of opposed channel supporting members 104 having the lower ends 105 thereof secured to the inner faces of the feed roll mounting panels 44.

A pair of knurled feed rolls 106, 106 are secured to the driven lower feed roll shaft 43 in spaced relation and are disposed in position to engage the end of a bag presented thereto from the upper feed rolls, and are opposed by a pair of idle rolls 107, 107 normally engaged therewith. The idle rolls 107 are carried by a shaft 108 journaled intermediate the ends of a pair of spaced brackets 109. The forward ends of the brackets 109 are pivotally connected to the feed roll mounting panels 44, and the rear ends thereof are supported by position-adjusting screws 110 threadably engaged therewith and having their lower ends resting on the upper edges of the adjacent panel sections 44 (see Figs. 7, 10 and 15).

After the bag end passes between the lower feed rolls 106 and 107 it is received into a chute 111 defined by a pair of generally opposed guide plates 112 and 113 pivotally secured between the mounting panels 44, and which deflects the path of travel of the bag downwardly into a receiver 114 preparatory to presentation to the associated bag opening machine B.

Control means are provided for automatically detecting and ejecting any "double decker" bags that might accidently be withdrawn from the stack. In this connection the rearwardly projecting ends of the idle roll support brackets 109 are each provided with an aperture through which an eye-bolt 115 extends, with the stem thereof projecting upwardly (see Fig. 15). The eye of the bolt 115 is pivotally connected to the free end of a lever arm 116 which is fixed to a rock shaft 117 journaled in the mounting panels 44 slightly below and to the rear of the feed rolls 106, 107. A plurality of bag deflecting fingers 118 are secured to the rock shaft 117 in spaced parallel relation and project upwardly and forwardly against the direction of travel of the bags. The normal position of the fingers is in a plane out of the exact path of travel of the bags and this position is obtained by raising and lowering the free end of the lever arm 116 through the medium of adjusting nuts 119 engaged on the upper projecting ends of the eye-bolt 115.

Thus when a "double decker" is drawn from the stack and presented to the lower feed rolls during the cycle of feeding, the added thickness thereof will raise the idle rolls 107 an abnormal distance thereby also raising the brackets 109. The free ends of the brackets 109, by virtue of the specific mode of attachment of the brackets to the panels 44, will partake of a magnified upward movement, thereby drawing on the bolt 115 and the free end of the arm 116 connected thereto upwardly to oscillate the rock shaft 117 in a clockwise direction and move the ends of the deflecting fingers 118 downwardly across the path of travel of the bags (see Fig. 11). The "double deckers" are thus ejected out over the top of the deflecting plate 112.

In the feeding of the bags formed from relatively light paper it may be found desirable to provide supporting means for the central portions of the bags as they are moved from the upper set of feed rolls to the lower set, such means include a pair of spaced parallel supporting bars 120, 120 secured to a mounting block 121 which is rigidly affixed to one spacer element 45 extending between the mounting panels 44.

Bag cradle and transfer mechanism

The receiver 114 is a three-sided tapered structure adapted to retain bags presented thereto in proper registry with bag mouth opening elements forming part of the carriage structure, and includes front and rear walls 115' and 116' respectively, an end wall 117', and a bottom 118'. The front wall 115' is provided with mounting flanges 119' for fastening the receiver to a bracket 120' carried by the main supporting frame for the carriage. It should be noted that the width of the front and rear walls 115' and 116' is less than the width of the bag so that devices, the nature of which will be hereinafter described, can accurately register the bag against the end wall 117'.

The bag traversing devices as a whole are mounted on a supporting cradle generally indicated at E. The cradle comprises a right angle supporting plate having a horizontal shelf portion 121 and a vertical wall portion 122. A pair of vertical spaced parallel angle beams 123, 123 are secured to the front face of the wall portion 122 and are located near the central portion thereof. Each beam 123 carries a pair of laterally extending and vertically spaced roller mounting blocks 124 having faces 125, 126 disposed perpendicular to each other and provided with studs 127 normal to the faces 125 and 126. A roller 128 is mounted on each stud 127 and is engageable with the main frame standard 6 associated therewith. Thus the supporting cradle E is carried by the standard 6 and is adapted for vertical reciprocatory movement therebetween.

The vertical wall portion 122 of the supporting plate carries a lower horizontal rearwardly extending shelf or bracket extension 129 supported by suitable braces as indicated at 130. The rear edge of the extension 129 is disposed in vertical alignment with the rear edge of the horizontal shelf portion 121. The underside of the shelf 121 and the upper side of the extension 129 are respectively provided with rails 131 of square cross-section and mounted V-chocks 132.

Lateral traversing movement of a bag is provided through use of a second cradle assembly generally indicated at 133 and which is mounted between the horizontal rails 131. The cradle 133 includes a generally rectangular frame having a pair of spaced parallel longitudinal stringers 134 of square cross-section and a pair of vertically disposed spacing members 135 rigidly secured therebetween (see Figs. 6, 18, 20 and 22). Each stringer 134 is provided with horizontally spaced sets of guiding and retaining rollers 136 arranged in complementary pairs of studs 137 angularly spaced 90° and engageable with the rails 131 to thereby rollably support the cradle 133 therebetween.

The upper ends of the spacing members 135 of the cradle 133 project upwardly and rearwardly to a line slightly above and to the rear of the upper stringer 134, and are provided with apertures through which a horizontally disposed rod 138 extends. The rod 138 constitutes the main supporting means for the parts attached to the cradle 133.

A bracket 139 is mounted on the rod 138 and carries a plurality of rearwardly extending suction cups 140 adapted to engage the top front wall portion of the bag D resting in the receiver 114. The suction cups 140 are mounted in bank formation and are connected to a source of vacuum through a flexible hose 141 and a control valve, the nature of which will be hereinafter more fully described.

A second set of suction cups 142 is adapted to be brought into and out of engagement with the top rear face of the bag D and is mounted on the horizontally extending portion 144 of a vertically disposed mounting bar 143. The lower end of the bar 143 is secured in the rear end of a tilting lever 145 pivotally connected intermediate its ends to the lower end of a mounting strap 146 carried by the horizontal bar 138. The lower end of the strap 146 is maintained in rigid position relative to the frame of the cradle 133 by an angle brace 147.

The forward end of the tilting lever 145 is provided with a stud 148 having a roller cam follower 149 mounted thereon and adapted to be engaged in the slot of a plate cam assembly used as actuating means for the tilting bar 145 at properly timed intervals to bring the suction cups 142 into and out of engagement with the bag D and to partially open the mouth of a bag in conjunction with the suction cups 140. The forward end of the lever 145 is constantly urged downwardly by the action of spring and rod connections generally indicated at 150 and extending between the forward end of the lever and an angle beam 151 of the cradle frame.

The lower end of the mounting bar 146 may be provided with an angle piece 152 having a cap screw 153 threadably engaged in the flange thereof and which is adjustable to limit downward swing of the forward end of the tilting lever 145.

Oscillation of the tilting lever 145 is effected through the medium of a contour cam assembly generally indicated at 154 and with which the cam follower 149 is engageable.

The cam assembly 154 includes a rear main cam plate 155 secured to a bracket 156 dependably fastened to the horizontal extension 129 and spaced therefrom by spacer elements 157. It is therefore readily apparent that the cam assembly 154 is stationarily mounted on the main cradle assembly E, and that the traversing carriage 133 is laterally movable relative thereto. The cam plate 155 is provided with a main cam follower receiving slot 158 of the general contour necessary to provide the desired path of travel of the tilting bar 145 but of a width greater than the diameter of the follower 149 thereof.

The backing plate 159 carries a pair of spaced generally parallel upper and lower secondary cam plates 160 and 161 respectively which are rigidly secured thereto and spaced therefrom by spacer elements 162. The secondary cam plates 160 and 161 are respectively provided with oppositely directed slots 163 and 164 engageable with vertically spaced T-shaped blocks 165 and 166 mounted on stud bolts 167 and 168 secured to the cam plate 155. Thus the secondary cam plates 160 and 161, together with the backing plate 159, are vertically reciprocable relative to the main cam plate 155. The secondary cam plate 160 functions to direct the path of travel of the cam follower 149 when the mechanism is in the position indicated in Fig. 23; and the secondary cam plate 161 functions to direct the path of travel of the cam follower 149 when the mechanism is in the position indicated in Fig. 24.

The cradle E is provided with a lug 169 secured thereto and pivotally connected to the lower end of a link 170. The upper end of the link 170 is pivotally connected to one end of a lever 171 which is pivotally connected intermediate its ends to the cam plate 155 as at 172 and has its free end 173 engageable with an undercut shoulder 174 formed in one end of the secondary cam plate 161.

The secondary cam plates 160 and 161 and the associated backing plate 159 are adapted to be maintained in raised position during a portion of the cycle of operation by a latch dog 175 normally disposed to one side of the T block 166, but adapted to rest on the upper face thereof. The dog 175 is rigidly and dependably secured to one end of an arm 176 pivotally mounted at 177 in the space between the cam plate 155 and the backing plate 159 and having an upturned end portion 178 adapted to be engaged and depressed by the cam follower 149. The end 178 of the arm 176 is constantly urged upwardly by the action of a tension spring 179 extending between a stud 180 secured to the arm 176 and a stud 181 secured to the backing plate 159.

Application of vacuum to the sets of suction cups 140 and 142 is controlled through a valve assembly generally indicated at 182 (see Figs. 7, 14, 16 and 17). The valve assembly 182 includes a chambered casing 183 rigidly secured to one rear bracket extension 34 by bolts 184 and spaced therefrom by spacing elements 185. The casing 183 is provided with an upstanding lug having a bearing boss 186 formed integral therewith and adapted to pivotally support a pair of valve levers 187 and 188, respectively, located on opposite sides of the casing. The lower end of the lever 187 is provided with a slide valve 189 of the unbalanced D type, and the lower end of the lever 188 is provided with a similar valve 190.

The valve casing 183 is connected to a source of vacuum (not shown) by a hose 191 extending into open communication with a chamber 192 formed in the casing. The suction cups 140 and 142 are connected to the valve by the hose 141 extending into open communication with a chamber 193 formed in the valve casing; and the bag selector 58 of the feeding mechanism is connected to the valve by a hose 194 extending into open communication with a chamber 195 formed in the casing. The chamber 192 is operatively connected to the chamber 195 by the D valve 189 and is operatively connected to the chamber 193 by the D valve 190 (see Fig. 14).

Each of the valve levers 187 and 188 is constantly urged towards the forward limit of oscillation by means which include a rod 196 having one end pivotally secured to the associated lever and extending through an upstanding lug 197 formed on the valve casing 183. The projecting end of the rod carries a compression spring 198 mounted thereon and interposed between the lug 197 and retaining nuts 199 threadably engaged on the end of the rod 196.

The valve lever 187 is oscillated in opposition to its associated spring 198 through the medium of a cam follower 200 mounted on the upper end of the lever and engageable actuating cam 201 adjustably secured to the main cam shaft 29; and the valve lever 188 is oscillated in opposition to its associated spring 198 through the medium of a cam follower 202 mounted on the upper end of the lever and engageable with an actuating cam 203 adjustably mounted on the main cam shafts 29.

The cam 201 is comprised of two relatively adjustable plates movable to vary the period of dwell of the cam follower 200 in order to facilitate proper timing of the bag selector 58 in withdrawing bags from a stack and presenting them to the feed rolls. The cam 203 is provided with a long period of dwell in order that the suction cups 140 and 142 may be maintained in effective operation during opening of the bag mouth and transfer of the bag from the feeding station to the associated bag opening and filling machine.

The cradle 133 is adapted to be horizontally traversed by mechanism which includes a bellcrank lever 204 pivotally secured at 205 to the frame of the vertically reciprocable cradle E and is provided with a short arm 206 and a long arm 207. A tension spring 208 has its upper end connected to the short arm 206 of the bell crank and its lower end adjustably secured adjacent one mounting flange 7 of the standard 6. The spring 208 constantly tends to move the bell crank 204 in a clockwise direction about its pivot 205 thereby attempting to move the upper end of the arm 207 thereof in a general left to right direction. A link 209 has one end pivotally connected to the upper end of the arm 207 and its other end pivotally connected to the traversing cradle 133. Thus lateral oscillation of the upper end of the arm 207 of the bell crank will effect a lateral reciprocation of the cradle assembly 133 to move a bag from the feed station to the opening station of the associated bag opening and filling machine.

The right to left movement of the cradle assembly 133 is effected through use of a sprocket chain 210 having its upper end secured to a collar 211 fastened to one standard 6 and its lower end secured to the link 16. The sprocket chain 210 is carried over a pair of sprocket gears 212, 212 rotatably mounted on the frame of the vertically movable crade E and is also formed into a bight intermediate the gears 212 which is engaged over a sprocket gear 213 rotatably mounted on the arm 207 of the bell crank 204 and located intermediate the end of the arm and the pivot 205. Thus if the link 16 is moved downwardly by action of the cam 13 on the rock arm 15, the bight of the chain 210 will be shortened and the sprocket gear 213 will be drawn to the left thereby pivoting the bell crank 204 counterclockwise and moving the upper end of the arm 207 thereof to the left and move the cradle 133 to its starting position.

*Operation*

It is believed that the description of the bag feeding mechanism from the supply stack to the receiver is sufficiently clear that it is unnecessary at this time to include a detailed description of the operation thereof.

Briefly, a bag D is withdrawn from the supply stack by the suction selector 58 and engaged by the gripper jaws 70 and 71 which are moved bodily to draw the bag downwardly into engagement with the stop fingers 83 and then releasing the bag. At this time the idle roll 93 is moved towards contact with the driven feed roll 92 for feed movement of the bag. Simultaneously the stop fingers 83 are displaced out of the path of travel of the bag. The bag is then moved between the lower feed rolls 106 and 107 and is fed downwardly through the delivery chute 111 into the receiver 114.

Figure 34:
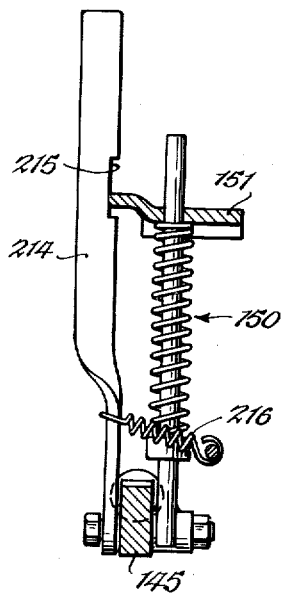
Figs. 34, 35 and 36 are somewhat fragmentary detail sections of the latching mechanism.
Figure 35:
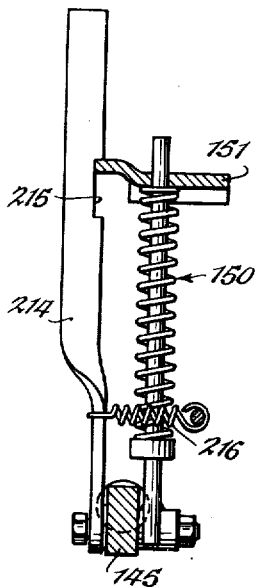
Figure 36:
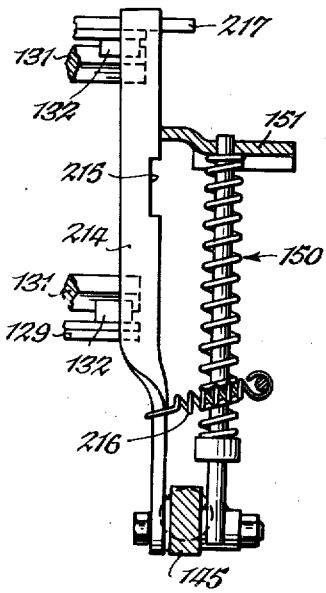
Figure 37:
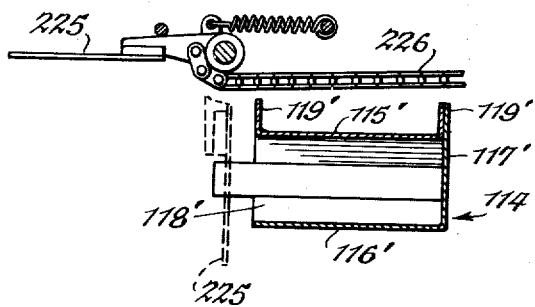
Fig. 37 is a horizontal section taken on line 37—37 of Fig. 18, certain details of the mechanism being omitted.

As the cradle assembly 133 is moved into position to engage the bag retained in the receiver the forward end of the tilting lever 145 is maintained in raised position in order to maintain the suction cups 142 spaced from the bag until they are brought into registry therewith for bag mouth opening operations. The forward end of the tilting lever 145 is maintained in raised position during a portion of the cycle of operation by latching devices (see Figs. 34, 35 and 36) which include a latch bar 214 having its lower end pivotally secured to the tilt lever 145 adjacent the forward end thereof and is provided with a laterally disposed rectangular notch 215 located near its upper end. The notch 215 is adapted to be engaged by the end of the angle bracket 151 and is of such height as to permit an additional degree of movement of the tilting lever 145 after engagement with the angle bracket 151. The upper end of the latch bar 214 is constantly urged towards the angle 151 through the medium of a tension spring 216 having one end secured to the latch bar and its other end secured to the frame of the cradle 133. The latch 214 is adapted to be disengaged from the angle bracket 151 by coming into contact with an abutment bar 217 mounted on a frame of the vertically movable cradle E.

As the cradle 133 reaches the proper position to place the suction cups 140 and 142 in registry with the bag D held in the receiver 114, the upper end of the latch bar 214 contacts the abutment bar 217 to disengage the latch and permit the spring urging means 150 associated with the tilt lever 145 to force the forward end of the lever downwardly and bring the suction cups 142 into engagement with the bag D.

Figure 14:
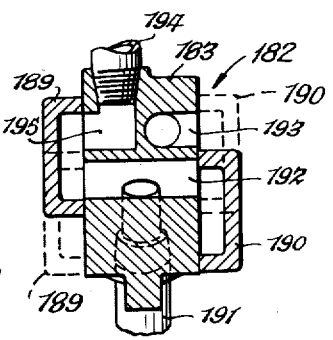
Fig. 14 is a horizontal section taken on line 14—14 of Fig. 7.

When the suction cups 142 have thus been brought into contact with the bag the slide valve 190 is oscillated by the cam 203 to the position indicated in dotted lines in Fig. 14 to thereby effect the application of suction from the chamber 192 of the valve 183 to the chamber 193 thereof and thence to the suction cups 140 and 142 which thereupon firmly hold the opposed wall sections of the bag.

The cradle 133 is then traversed horizontally by the bell crank and chain connections 204—211 as described. During traversing movement of the cradle 133 to place the bag D in registry with the opening station of the associated opening and filling machine, the forward end of the tilting lever 145 is raised as a result of engagement of the follower 149 thereof in the slot 158 of the plate cam assembly 154 to thereby move the cups 142 rearwardly and open the mouth of the bag.

After the bag mouth is thus opened, continued movement of the cradle 133 causes the bag to pass under a blast of air employed to partially open the bag and being expelled from a jet 218 carried by the frame of the vertically movable cradle E. Flow of air through the jet 218 is controlled through the medium of a valve 219 having an outwardly projecting valve actuating plunger 220. The plunger 220 is adapted to be pressed inwardly to open the valve during initial traversing movement of the cradle by a roller 221 carried on the free end of a lever 222 pivotally secured to a mounting block 223 fixed to the carriage frame rod 138 (see Fig. 33). The mounting block 223 is provided with a stop pin 224 which prevents displacement of the lever 222 during initial traversing movement of the cradle 133 but permits displacement of the lever during return movement of the cradle in order that the valve plunger 220 will not be depressed. The lever 222 is spring biased against the stop pin 224 to return the lever against the stop after displacement thereof during return movement of the cradle.

As the cradle 133 is approaching the end of its initial traversing movement another bag is being moved through the feed rolls and into the receiver 114. The bag is properly registered against the end wall 117' of the receiver by a paddle 225 which is pivotally mounted on the frame of the cradle E and spring urged away from the receiver. The paddle 225 is adapted to be brought into contact with the adjacent edge of the bag to push the bag against the end wall of the receiver by a chain 226 connecting the paddle and the cradle 133, so that as the cradle approaches the end of its initial traversing movement the chain 226 will be drawn tight. Continued movement of the cradle 133 will swing the paddle into contact with the bag. It should be noted that that end of the chain 226 which is connected to the cradle 133, is secured thereto through the medium of adjustable bolt connections 227 in order that movement of the paddle may be properly synchronized with movement of the cradle.

When the cradle 133 has reached the end of its initial traversing movement, the bag D which is carried by the suction cups 140 and 142 of the cradle assembly is disposed in registry with the bag opening elements of the associated opening and filling machine, and the cradle E is then raised by action of the cam, rock arm, follower, and link connections 14, 18, 19 and 20 to bring the bag into engagement with said bag opening elements.

It should be noted that since the sprocket chain 210 is engaged over a plurality of freely rotatable sprocket gears, vertical movement of the cradle E will cause no horizontal movement of the traversing cradle 133.

Figure 32:
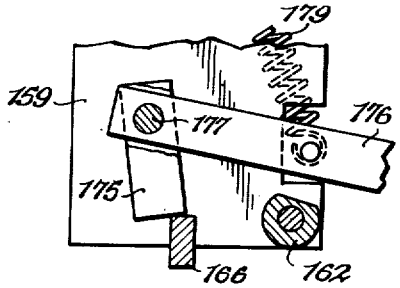
Fig. 32 is a vertical section taken on line 32—32 of Fig. 27.
Figure 30:
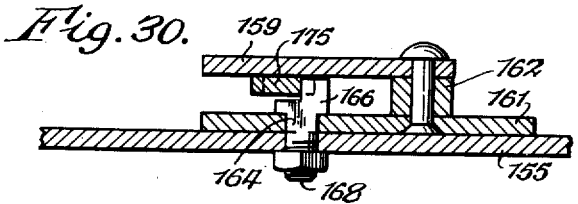
Fig. 30 is a horizontal section taken on line 30—30 of Fig. 23.
Figure 31:
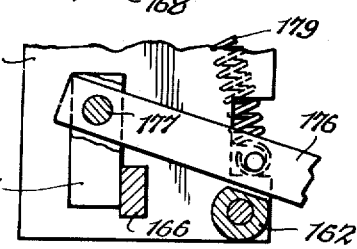
Fig. 31 is a vertical section taken on line 31—31 of Fig. 26.

When the cradle E reaches the limit of vertical travel the bag is engaged by clamping elements of the associated opening and filling machine and the application of suction to the cups 140 and 142 is stopped to thereby release the bags from engagement therewith. After the suction cups have been released from engagement with the bag the cradle E is then lowered to its normal position. As the cradle E is being raised the lever 171 associated with the plate cam assembly 154 is oscillated to raise the end 173 thereof upwardly and thereby raise the secondary cam plate 161 to the position indicated in Fig. 24. This raising of the secondary cam plate 161 permits a pivotal movement of the arm 176 under the effect of the spring 179 to bring the latch dog 175 into plate-supporting position (see Figs. 24 and 32).

Continued rotation of the cradle actuating cam 13 relieves the downward pull on the link 16 and the depending end of the sprocket chain 210 connected therewith and permits the tension spring 208 to become effective to initiate a return traversing movement of the cradle 133.

During the first portion of the return movement of the cradle 133 the follower 149 of the tilting lever 145 rides over the secondary cam plate 161 which projects above the lower edge of the cam slot 158. This effects a slight additional tilting of the lever 145 to thereby move the suction cups 142 away from the wall of the bag D so that the suction cups will not scrape over the surface of the bag and disrupt the position thereof on the associated bag opening and filling machine.

After the movement of the cradle 133 has progressed to the point where the follower 149 is disengaged from the secondary cam plate 161, the forward end of the tilting lever 145 is still maintained in the raised position by the latch 214 as hereinbefore described.

Figure 23:
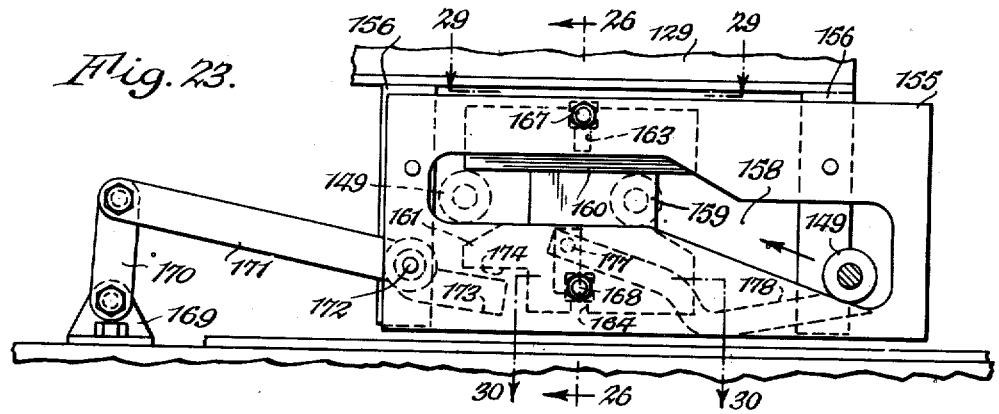
Fig. 23 is a vertical section taken on line 23—23 of Fig. 6 and shows the cam actuating elements of the suction cup tilting mechanism.
Figure 24:
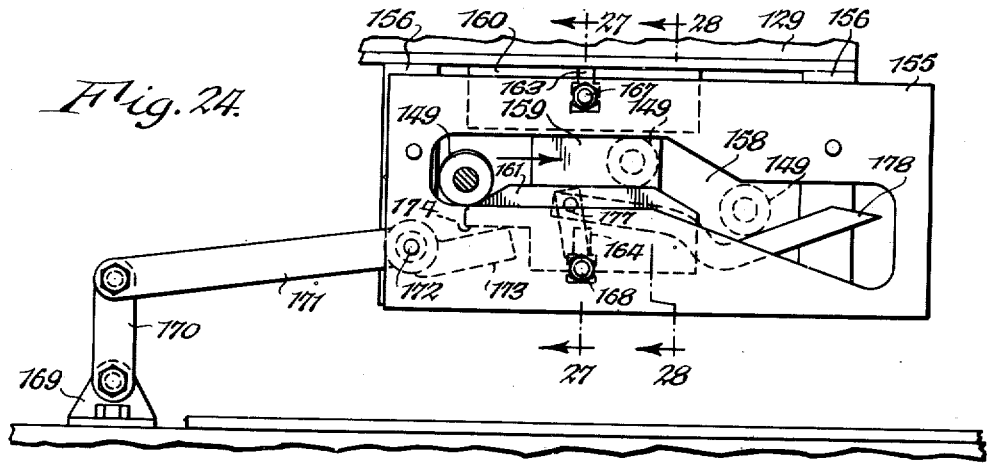
Fig. 24 is a view similar to Fig. 23, but showing the positions of the parts at the end of the carriage movement to the opening station.
Figure 25:
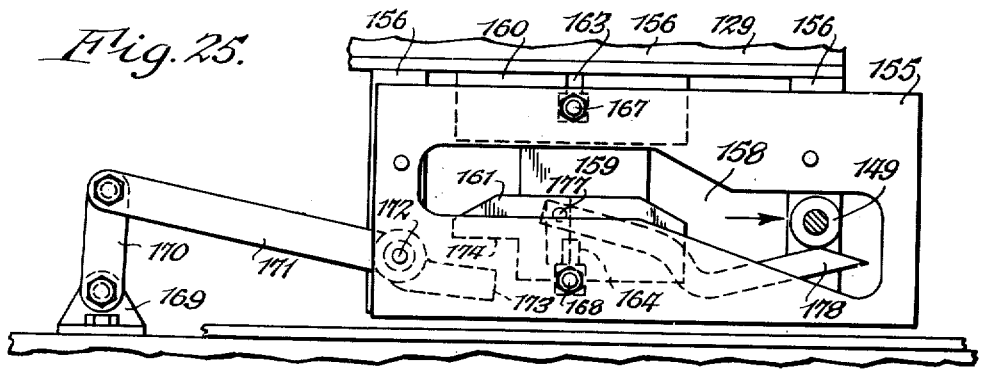
Fig. 25 is a view similar to Figs. 23 and 24, but showing the positions of the parts at the end of the return movement and just prior to time at which suction cups engage a freshly presented bag.
Figure 26:
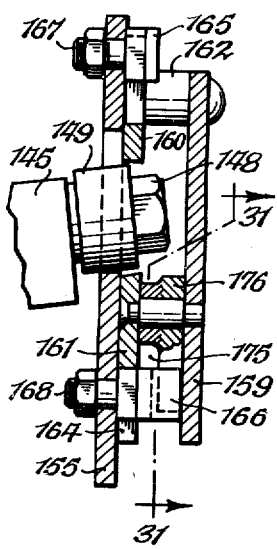
Fig. 26 is a vertical section taken on line 26—26 of Fig. 23.
Figure 27:
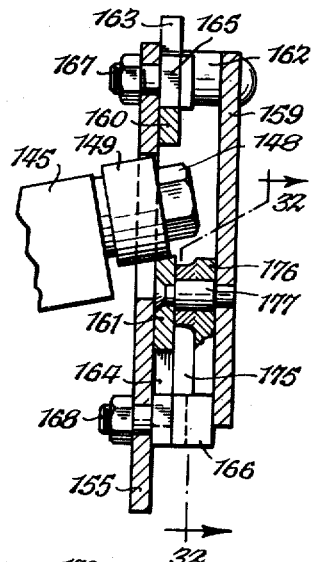
Fig. 27 is a vertical section taken on line 27—27 of Fig. 24.
Figure 28:
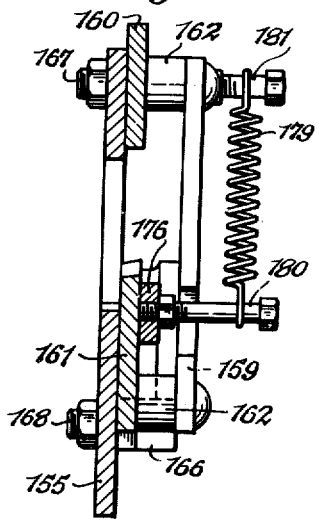
Fig. 28 is a vertical section taken on line 28—28 of Fig. 24.
Figure 29:
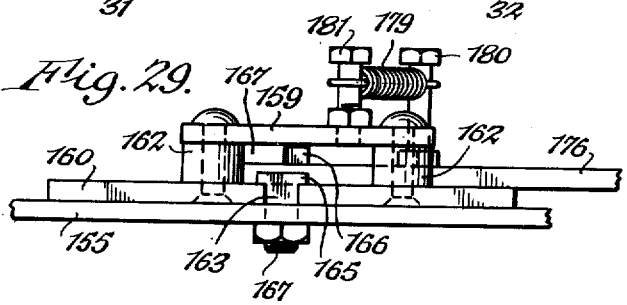
Fig. 29 is a horizontal section taken on line 29—29 of Fig. 23.

When the cradle 133 has returned to its starting position the latch 214 has become released, thereby allowing the forward end of the tilting bar 145 to be urged downwardly as described, and simultaneously the follower 149 thereof presses down the upturned end 178 of the arm 176 to thereby swing the latch dog 175 out of its plate supporting position to allow the secondary cam plate 161 to return to the normal lowered position as indicated in Fig. 23.

*Modified Form of Bag Selector*

Figure 38:
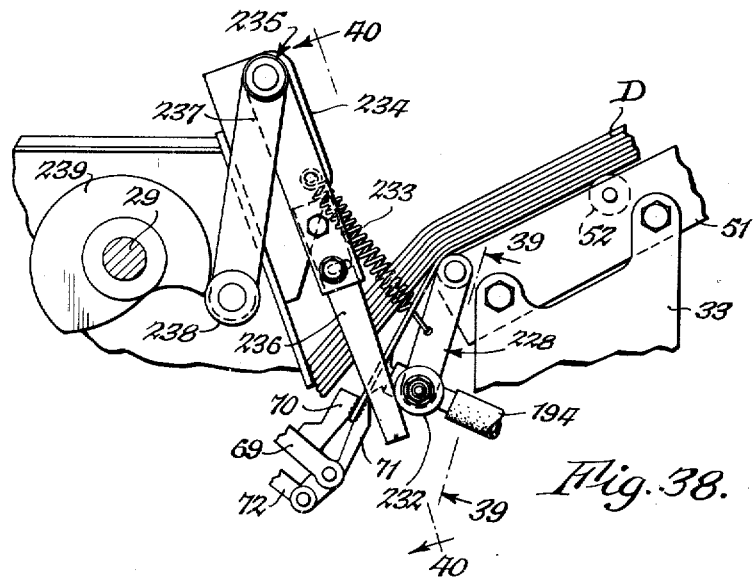
Fig. 38 is a vertical section generally similar to Fig. 9, but showing a modified mechanism for selecting a bag from the supply stack.
Figure 39:
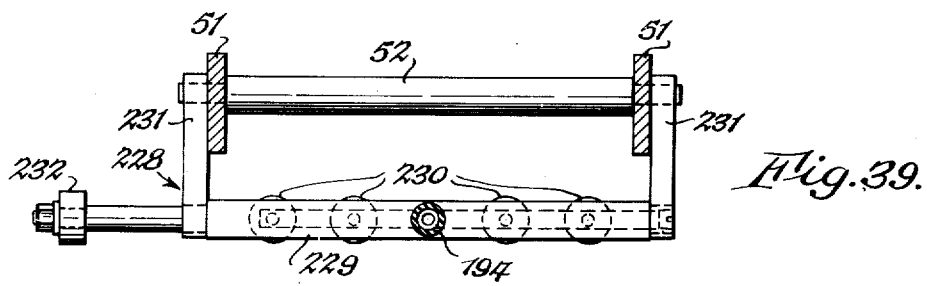
Fig. 39 is a detail section taken on line 39—39 of Fig. 38, certain of the parts being omitted.
Figure 40:
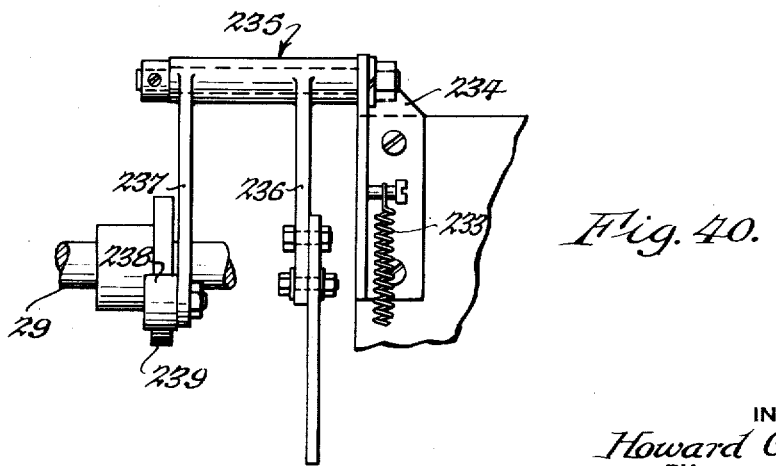
Fig. 40 is a detail elevational projection taken on line 40—40 of Fig. 38, certain of the parts being omitted.

In Figs. 38 to 40 inclusive of the drawings there is illustrated a modified form of selector mechanism which may be employed in place of the selector assembly 58.

In this form of bag selector a bail 228 is pivotally secured to the stringers 51 of the bag magazine at the axis of the lowermost supporting roller 52, and comprises a hollow, transversely extending rod 229 carrying a plurality of suction cups 230 and a pair of spaced bail ears 231, the upper end of which are pivotally connected to the stringers. The ends of the rod 229 are closed and the rod is connected to the suction control valve 182 by the flexible hose 194.

One end of the rod 229 projects beyond its associated bail ear 231 and is provided with a roller 232 rotatably mounted thereon.

The bail 228 is constantly urged towards contact with the bag stack by the action of a tension spring 233 having one end secured to the bail and its other end secured to the upstanding portion of a bracket 234 rigidly secured to the abutment plate 65 at the base of the magazine.

The bracket 234 carries a pivotally mounted two-armed lever 235 having an arm 236 engageable with the roller 232 on the bail, and a second arm 237 provided at its end with a roller cam follower 238 engageable with an actuating cam 239 secured to the cam shaft 29. Thus rotation of the cam shaft 29 will effect oscillation of the two-armed lever 235 and the arm 236 thereof which engages the bail roller 232 will effect a swinging of the bail away from the bag stack and the end of the bottom bag will be displaced therefrom.

It should of course be realized that suction is applied to the cups 230 in the same manner and at the same timed intervals as it was applied to the cups 61 of the selector assembly 58.

Thus it will be seen that the herein described invention provides a novel machine for automatically feeding bags from a supply magazine to a bag opening and filling machine with which it is associated; which will withdraw a single bag from a supply stack, partially open the mouth thereof, transfer the partially open bag from the station adjacent the supply stack to the opening station of the associated opening and filling machine, and raise the partially open bag into engaging relation with the bag opening devices of said opening machine; which includes ejecting mechanism effective to reject any bags withdrawn from the supply stack more than one at a time; and which is readily adjustable to facilitate feeding operations on bags of different sizes.

It is of course to be understood that certain details of arrangement and proportions of parts may be variously modified without exceeding the scope of the appended claims.

I claim:

1. In an automatic bag feeding machine adapted to supply bags individually to opening devices of an opening and filling machine associated therewith, a main supporting frame, a bag retaining magazine mounted on said frame, bag transfer devices movably supported on said frame and including a primary cradle vertically movable on the frame and a secondary cradle horizontally movable on said primary cradle, bag feeding means adapted to feed individual bags from said magazine to said bag transfer devices, means for moving said bag transfer devices horizontally to place the bag held thereby in registry with the opening devices of the associated opening and filling machine, and means to raise said bag transfer devices to thereby apply the bag to said associated opening and filling machine.

2. In an automatic bag feeding machine adapted to supply bags individually to opening devices of an opening and filling machine associated therewith, a main supporting frame, a bag retaining magazine mounted on said frame, bag transfer devices movably supported on said frame and including a primary cradle vertically movable on the frame and a secondary cradle horizontally movable on said primary cradle, bag feeding means adapted to feed individual bags from said magazine to said bag transfer devices, means for moving said bag transfer devices horizontally to place the bag held thereby in registry with the opening devices of the associated opening and filling machine, means to raise said bag transfer devices to thereby apply the bag to said associated opening and filling machine, and means disposed in cooperative relation to said bag feeding means for ejecting multiple bags presented thereto.

3. In an automatic bag feeding machine adapted to supply bags individually to opening devices of an opening and filling machine associated therewith, a main supporting frame, a bag retaining magazine mounted on said frame, bag transfer devices movably supported on said frame and including a primary cradle vertically movable on the frame and a secondary cradle horizontally movable on said primary cradle, a bag receiver, bag feeding means adapted to feed individual bags from said machine to said receiver, means mounted on said secondary horizontally movable cradle for opening the bag mouth, means for moving said secondary cradle horizontally to withdraw the bag from said receiver and place said bag in registry with the opening devices of the associated opening and filling machine, and means to raise said primary cradle to thereby apply said bag to said associated opening and filling machine.

4. In an automatic bag feeding machine adapted to supply bags individually to opening devices of an opening and filling machine associated therewith, a main supporting frame, a bag retaining magazine mounted on said frame, bag transfer devices movably supported on said frame and including a primary cradle vertically movable on the frame and a secondary cradle horizontally movable on said primary cradle, a bag receiver, bag feeding means adapted to feed individual bags from said magazine to said receiver, means mounted on said secondary horizontally movable cradle for opening the bag mouth, means for moving said secondary cradle horizontally to withdraw the bag from said receiver and place said bag in registry with the opening devices of the associated opening and filling machine, means to raise said primary cradle to thereby apply said bag to said associated opening and filling machine, and means disposed in cooperative relation to said bag feeding means for ejecting multiple bags presented thereto.

5. In an automatic bag feeding machine adapted to supply bags individually to opening devices of an opening and filling machine associated therewith, a main supporting frame, a bag retaining magazine mounted on said frame, bag transfer devices movably supported on said frame and including a primary cradle vertically movable on the frame and a secondary cradle horizontally movable on said primary cradle, bag feeding means mounted in definite relation to said magazine and adapted to feed individual bags from said magazine to said bag transfer devices, said magazine and bag feeding means being adjustable on said frame to permit feeding of different sized bags to said bag transfer devices, means for moving said bag transfer devices horizontally to place the bag held thereby in registry with the opening devices of the associated opening and filling machine, and means to raise said bag transfer devices to apply the bag to said associated opening and filling machine.

6. In an automatic bag feeding machine adapted to supply bags individually to opening devices of an opening and filling machine associated therewith, a main supporting frame, a bag retaining magazine mounted on said frame, bag transfer devices movably supported on said frame and including a primary cradle vertically movable on the frame and a secondary cradle horizontally movable on said primary cradle, bag feeding means mounted in definite relation to said magazine and adapted to feed individual bags from said magazine to said bag transfer devices, said magazine and bag feeding means being adjustable on said frame to permit feeding of different sized bags to said bag transfer devices, means for moving said bag transfer devices horizontally to place the bag held thereby in registry with the opening devices of the associated opening and filling machine, means to raise said bag transfer devices to apply the bag to said associated opening and filling machine, and means disposed in cooperative relation to said bag feeding means for ejecting multiple bags presented thereto.

7. In an automatic bag feeding machine adapted to supply bags individually to opening devices of an opening and filling machine associated therewith, a main supporting frame, a bag retaining magazine mounted on said frame, bag transfer devices movably supported on said frame and including a primary cradle vertically movable on the frame and a secondary cradle horizontally movable on said primary cradle, a bag receiver, bag feeding means mounted in definite relation to said magazine and adapted to feed individual bags from said magazine to said receiver, said magazine and bag feeding means being adjustable on said frame to permit feeding of different sized bags to said receiver, means mounted on said secondary cradle for opening the bag mouth, means for moving said secondary cradle horizontally to withdraw the bag from said receiver and place said bag in registry with the opening devices of the associated opening and filling machine, and means to raise said primary cradle to thereby apply said bag to said associated opening and filling machine.

8. In an automatic bag feeding machine adapted to supply bags individually to opening devices of an opening and filling machine associated therewith, a main supporting frame, a bag retaining magazine mounted on said frame, bag transfer devices movably supported on said frame and including a primary cradle vertically movable on the frame and a secondary cradle horizontally movable on said primary cradle, a bag receiver, bag feeding means mounted in definite relation to said magazine and adapted to feed individual bags from said magazine to said receiver, said magazine and bag feeding means being adjustable on said frame to permit feeding of different sized bags to said receiver, means mounted on said secondary cradle for opening the bag mouth, means for moving said secondary cradle horizontally to withdraw the bag from said receiver and place said bag in registry with the opening devices of the associated opening and filling machine, means to raise said primary cradle to thereby apply said bag to said associated opening and filling machine, and means disposed in cooperative relation to said bag feeding means for ejecting multiple bags presented thereto.

9. In an automatic bag feeding machine adapted to supply bags individually to opening devices of an opening and filling machine associated therewith, a main supporting frame, a bag retaining magazine mounted on said frame, bag transfer devices movably supported on said frame and including a primary cradle vertically movable on the frame and a secondary cradle horizontally movable on said primary cradle, a bag receiver, bag feeding means adapted to feed individual bags from said magazine to said receiver, means mounted on said secondary horizontally movable cradle for opening the mouth of the bag and holding the same open, means for moving said secondary cradle horizontally to withdraw the bag from said receiver and place said bag in registry with the opening devices of the associated opening and filling machine, means to raise said primary cradle to thereby apply said bag to said associated opening and filling machine, means for disengaging said bag mouth opening means, and means for moving said bag mouth opening means an additional amount subsequent to disengagement thereof from said bag whereby said bag mouth opening means will not contact the bag during return movement of said bag transfer devices.

10. In an automatic bag feeding machine adapted to supply bags individually to opening devices of an opening and filling machine associated therewith, a main supporting frame, a bag retaining magazine mounted on said frame, bag transfer devices movably supported on said frame and including a primary cradle vertically movable on the frame and a secondary cradle horizontally movable on said primary cradle, a bag receiver, bag feeding means adapted to feed individual bags from said magazine to said receiver, means mounted on said secondary horizontally movable cradle for opening the mouth of the bag and holding the same open, means for moving said secondary cradle horizontally to withdraw the bag from said receiver and place said bag in registry with the opening devices of the associated opening and filling machine, means to raise said primary cradle to thereby apply said bag to said associated opening and filling machine, means for disengaging said bag mouth opening means, means for moving said bag mouth opening means an additional amount subsequent to disengagement thereof from said bag whereby said bag mouth opening means will not contact the bag during return movement of said bag transfer devices, and means disposed in cooperative relation to said bag feeding means for ejecting multiple bags presented thereto.

11. In an automatic bag feeding machine adapted to supply bags individually to opening devices of an opening and filling machine associated therewith, a bag retaining magazine mounted on said frame, bag transfer devices movably supported on said frame and including a primary cradle vertically movable on the frame and a secondary cradle horizontally movable on said primary cradle, a bag receiver, bag feeding means adapted to feed individual bags from said magazine to said receiver, means mounted on said secondary horizontally movable cradle for engaging opposed wall sections of the mouth of a bag held in said receiver, means for imparting a movement of separation between said bag engaging means to thereby open the mouth of said bag, means for moving said secondary cradle horizontally to withdraw the bag from said receiver and place said bag in registry with the opening devices of the associated opening and filling machine, means to raise said primary cradle to thereby apply said bag to said associated opening and filling machine, and means for disengaging said bag engaging means.

12. In an automatic bag feeding machine adapted to supply bags individually to opening devices of an opening and filling machine associated therewith, a bag retaining magazine mounted on said frame, bag transfer devices movably supported on said frame and including a primary cradle vertically movable on the frame and a secondary cradle horizontally movable on said primary cradle, a bag receiver, bag feeding means adapted to feed individul bags from said magazine to said receiver, means mounted on said secondary horizontally movable cradle for engaging opposed wall sections of the mouth of a bag held in said receiver, means for imparting a movement of separation between said bag engaging means to thereby open the mouth of said bag, means for moving said secondary cradle horizontally to withdraw the bag from said receiver and place said bag in registry with the opening devices of the associated opening and filling machine, means to raise said primary cradle to thereby apply said bag to said associated opening and filling machine, means for disengaging said bag engaging means, and means for imparting an additional movement of separation to said bag engaging means subsequent to disengagement thereof from said bag whereby said bag engaging means will not contact the bag during return movement of said bag transfer devices.

13. In an automatic bag feeding machine adapted to supply bags individually to opening devices of an opening and filling machine associated therewith, a bag retaining magazine mounted on said frame, bag transfer devices movably supported on said frame and including a primary cradle vertically movable on the frame and a secondary cradle horizontally movable on said primary cradle, a bag receiver, bag feeding means adapted to feed individual bags from said magazine to said receiver, means mounted on said secondary horizontally movable cradle for engaging opposed wall sections of the mouth of a bag held in said receiver, means for imparting a movement of separation between said bag engaging means to thereby open the mouth of said bag, means for moving said secondary cradle horizontally to withdraw the bag from said receiver and place said bag in registry with the opening devices of the associated opening and filling machine, means to raise said primary cradle to thereby apply said bag to said associated opening and filling machine, means for disengaging said bag engaging means, means for imparting an additional movement of separation to said bag engaging means subsequent to disengagement thereof from said bag whereby said bag engaging means will not contact the bag during return movement of said bag transfer devices, and means disposed in cooperative relation to said bag feeding means for ejecting multiple bags presented thereto.

14. In an automatic bag feeding machine adapted to supply bags individually to opening devices of an opening and filling machine associated therewith, a bag magazine mounted on said frame and adapted to hold a stack of bags placed therein, a bag selecting device associated with one end of said magazine and adapted to separate the end of the bottom bag from the stack, bag transfer devices movably supported on said frame and including a primary cradle vertically movable on the frame and a secondary cradle horizontally movable on said primary cradle, a bag receiver, bag feeding means engageable with the bag end thus separated and adapted to feed said bag from said magazine to said receiver, means mounted on said secondary horizontally movable cradle for engaging opposed wall sections of the mouth of a bag held in said receiver, means for imparting a movement of separation between said bag engaging means to thereby open the mouth of said bag, means for moving said secondary cradle horizontally to withdraw the bag from said receiver and place said bag in registry with the opening devices of the associated opening and filling machine, means to raise said primary cradle to thereby apply said bag to said associated opening and filling machine, and means for disengaging said bag engaging means.

15. In an automatic bag feeding machine adapted to supply bags individually to opening devices of an opening and filling machine associated therewith, a bag magazine mounted on said frame and adapted to hold a stack of bags placed therein, a bag selecting device associated with one end of said magazine and adapted to separate the end of the bottom bag from the stack, bag transfer devices movably supported on said frame and including a primary cradle vertically movable on the frame and a secondary cradle horizontally movable on said primary cradle, a bag receiver, bag feeding means engageable with the bag end thus separated and adapted to feed said bag from said magazine to said receiver, means mounted on said secondary horizontally movable cradle for engaging opposed wall sections of the mouth of a bag held in said receiver, means for imparting a movement of separation between said bag engaging means to thereby open the mouth of said bag, means for moving said secondary cradle horizontally to withdraw the bag from said receiver and place said bag in registry with the opening devices of the associated opening and filling machine, means to raise said primary cradle to thereby apply said bag to said associated opening and filling machine, means for disengaging said bag engaging means, and means for imparting an additional movement of separation to said bag engaging means subsequent to disengagement thereof from said bag whereby said bag engaging means will not contact the bag during return movement of said bag transfer devices.

16. In an automatic bag feeding machine adapted to supply bags individually to opening devices of an opening and filling machine associated therewith, a bag magazine mounted on said frame and adapted to hold a stack of bags placing therein, a bag selecting device associated with one end of said magazine and adapted to separate the end of the bottom bag from the stack, bag transfer devices movably supported on said frame and including a primary cradle vertically movable on the frame and a secondary cradle horizontally movable on said primary cradle, a bag receiver, bag feeding means engageable with the bag end thus separated and adapted to feed said bag from said magazine to said receiver, means mounted on said secondary horizontally movable cradle for engaging opposed wall sections of the mouth of a bag held in said receiver, means for imparting a movement of separation between said bag engaging means to thereby open the mouth of said bag, means for moving said secondary cradle horizontally to withdraw the bag from said receiver and place said bag in registry with the opening devices of the associated opening and filling machine, means to raise said primary cradle to thereby apply said bag to said associated opening and filling machine, means for disengaging said bag engaging means, means for imparting an additional movement of separation to said bag engaging means subsequent to disengagement thereof from said bag whereby said bag engaging means will not contact the bag during return movement of said bag transfer devices, and means disposed in cooperative relation to said bag feeding means for ejecting multiple bags presented thereto.

17. In an automatic bag feeding machine adapted to supply bags individually to opening devices of an opening and filling machine associated therewith, a bag retaining magazine mounted on said frame, bag transfer devices movably supported on said frame and including a primary cradle vertically movable on the frame and a secondary cradle horizontally movable on said primary cradle, a bag receiver, bag feeding means mounted in definite relation to said magazine and adapted to feed individual bags from said magazine to said receiver, said magazine and bag feeding means being adjustable on said frame to permit feeding of different sized bags to said receiver, means mounted on said secondary horizontally movable cradle for engaging opposed wall sections of the mouth of a bag held in said receiver, means for imparting a movement of separation between said bag engaging means to thereby open the mouth of said bag, means for moving said secondary cradle horizontally to withdraw the bag from said receiver and place said bag in registry with the opening devices of the associated opening and filling machine, means to raise said primary cradle to thereby apply said bag to said associated opening and filling machine, and means for disengaging said bag engaging means.

18. In an automatic bag feeding machine adapted to supply bags individually to opening devices of an opening and filling machine associated therewith, a bag retaining magazine mounted on said frame, bag transfer devices movably supported on said frame and including a primary cradle vertically movable on the frame and a secondary cradle horizontally movable on said primary cradle, a bag receiver, bag feeding means mounted in definite relation to said magazine and adapted to feed individual bags from said magazine to said receiver, said magazine and bag feeding means being adjustable on said frame to permit feeding of different sized bags to said receiver, means mounted on said secondary horizontally movable cradle for engaging opposed wall sections of the mouth of a bag held in said receiver, means for imparting a movement of separation between said bag engaging means to thereby open the mouth of said bag, means for moving said secondary cradle horizontally to withdraw the bag from said receiver and place said bag in registry with the opening devices of the associated opening and filling machine, means to raise said primary cradle to thereby apply said bag to said associated opening and filling machine, means for disengaging said bag engaging means, and means for imparting an additional movement of separation to said bag engaging means subsequent to disengagement thereof from said bag whereby said bag engaging means will not contact the bag during return movement of said bag transfer devices.

19. In an automatic bag feeding machine adapted to supply bags individually to opening devices of an opening and filling machine associated therewith, a bag retaining magazine mounted on said frame, bag transfer devices movably supported on said frame and including a primary cradle vertically movable on the frame and a secondary cradle horizontally movable on said primary cradle, a bag receiver, bag feeding means mounted in definite relation to said magazine and adapted to feed individual bags from said magazine to said receiver, said magazine and bag feeding means being adjustable on said frame to permit feeding of different sized bags to said receiver, means mounted on said secondary horizontally movable cradle for engaging opposed wall sections of the mouth of a bag held in said receiver, means for imparting a movement of separation between said bag engaging means to thereby open the mouth of said bag, means for moving said secondary cradle horizontally to withdraw the bag from said receiver and place said bag in registry with the opening devices of the associated opening and filling machine, means to raise said primary cradle to thereby apply said bag to said associated opening and filling machine, means for disengaging said bag engaging means, means for imparting an additional movement of separation to said bag engaging means subsequent to disengagement thereof from said bag whereby said bag engaging means will not contact the bag during return movement of said bag transfer devices, and means disposed in cooperative relation to said bag feeding means for ejecting multiple bags presented thereto.

20. In an automatic bag feeding machine adapted to supply bags individually to opening devices of an opening and filling machine associated therewith, a bag retaining magazine mounted on said frame, bag transfer devices movably supported on said frame and including a primary cradle vertically movable on the frame and a secondary cradle horizontally movable on said primary cradle, a bag receiver, bag feeding means adapted to feed individual bags from said magazine to said receiver, means mounted on said secondary horizontally movable cradle for engaging opposed wall sections of the mouth of a bag held in said receiver, means for imparting a movement of separation between said bag engaging means to thereby open the mouth of said bag, means for moving said secondary cradle horizontally to withdraw the bag from said receiver and place said bag in registry with the opening devices of the associated opening and filling machine, means to move said primary cradle vertically without disturbing the lateral position of said secondary cradle and the bag held thereon to thereby apply said bag to said associated opening and filling machine, and means for disengaging said bag engaging means.

21. In an automatic bag feeding machine adapted to supply bags individually to opening devices of an opening and filling machine associated therewith, a bag retaining magazine mounted on said frame, bag transfer devices movably supported on said frame and including a primary cradle vertically movable on the frame and a secondary cradle horizontally movable on said primary cradle, a bag receiver, bag feeding means mounted in definite relation to said magazine and adapted to feed individual bags from said magazine to said receiver, said magazine and bag feeding means being bodily adjustable on said frame to permit feeding of different sized bags to said receiver, means mounted on said secondary horizontally movable cradle for engaging opposed wall sections of the mouth of a bag held in said receiver, means for imparting a movement of separation between said bag engaging means to thereby open the mouth of said bag, means for moving said secondary cradle horizontally to withdraw the bag from said receiver and place said bag in registry with the opening devices of the associated opening and filling machine, means to move said primary cradle vertically without disturbing the lateral position of said secondary cradle and the bag held thereon to thereby apply said bag to said associated opening and filling machine, and means for disengaging said bag engaging means.

22. In an automatic bag feeding machine adapted to supply bags individually to opening devices of an opening and filling machine associated therewith, a bag retaining magazine mounted on said frame, bag transfer devices movably supported on said frame and including a primary cradle vertically movable on the frame and a secondary cradle horizontally movable on said primary cradle, a bag receiver, bag feeding means adapted to feed individual bags from said magazine to said receiver, means mounted on said secondary horizontally movable cradle for engaging opposed wall sections of the mouth of a bag held in said receiver, means actuated by said secondary cradle during horizontal movement thereof for accurately registering a bag held within said receiver with said bag mouth engaging means, means for imparting a movement of separation between said bag engaging means to thereby open the mouth of said bag, means for moving said secondary cradle horizontally to withdraw the bag from said receiver and place said bag in registry with the opening devices of the associated opening and filling machine, means to raise said primary cradle to thereby apply said bag to said associated opening and filling machine, and means for disengaging said bag engaging means.

23. In an automatic bag feeding machine adapted to supply bags individually to opening devices of an opening and filling machine associated therewith, a bag retaining magazine mounted on said frame, bag transfer devices movably supported on said frame and including a primary cradle vertically movable on the frame and a secondary cradle horizontally movable on said primary cradle, a bag receiver, bag feeding means adapted to feed individual bags from said magazine to said receiver, means mounted on said secondary horizontally movable cradle for engaging opposed wall sections of the mouth of a bag held in said receiver, means actuated by said secondary cradle during horizontal movement thereof for accurately registering a bag held within said receiver with said bag mouth engaging means, means for imparting a movement of separation between said bag engaging means to thereby open the mouth of said bag, means for moving said secondary cradle horizontally to withdraw the bag from said receiver and place said bag in registry with the opening devices of the associated opening and filling machine, means to raise said primary cradle to thereby apply said bag to said associated opening and filling machine, means for disengaging said bag engaging means, and means for imparting an additional movement of separation to said bag engaging means subsequent to disengagement thereof from said bag whereby said bag engaging means will not contact the bag during return movement of said bag transfer devices.

24. In an automatic bag feeding machine adapted to supply bags individually to opening devices of an opening and filling machine associated therewith, a main supporting frame, a bag retaining magazine mounted on said frame, bag transfer devices movably supported on said frame and including a primary cradle vertically movable on the frame and a secondary cradle horizontally movable on said primary cradle, a bag receiver, bag feeding means adapted to feed individual bags from said magazine to said receiver, means mounted on said secondary horizontally movable cradle for opening the bag mouth, means actuated by said secondary cradle during horizontal movement thereof for accurately registering a bag held within said receiver with said bag mouth opening means, means for moving said secondary cradle horizontally to withdraw the bag from said receiver and place said bag in registry with the opening devices of the associated opening and filling machine, and means to raise said primary cradle to thereby apply said bag to said associated opening and filling machine.

25. In an automatic bag feeding machine adapted to supply bags individually to bag engaging devices of a filling machine associated therewith, a main supporting frame, a bag retaining magazine mounted on said frame, bag carrying means movably supported on said frame, bag feeding means adapted to feed individual bags from said magazine to said bag carrying means, and cyclically operable means for first moving said bag carrying means in a single horizontal direction to place a bag held thereby in registry with the bag engaging devices of the associated filling machine and for then moving said bag carrying means vertically to thereby apply the bag to said associated filling machine.

26. In an automatic bag feeding machine adapted to supply bags individually to bag engaging devices of a filling machine associated therewith, a main supporting frame, a bag magazine mounted on said frame and adapted to hold a stack of bags placed therein, a bag selecting device associated with one end of said magazine and adapted to separate the end of the bottom bag from the stack, bag carrying means movably supported on said frame, bag feeding means engageable with the bag end thus separated and adapted to feed said bag from said magazine to said bag carrying means, and cyclically operable means for first moving said bag carrying means in a single horizontal direction to place the bag held thereby in registry with the bag engaging devices of the associated filling machine and for then moving said bag carrying means vertically to thereby apply the bag to said associated filling machine.

27. In an automatic bag feeding machine adapted to supply bags individually to bag engaging devices of a filling machine associated therewith, a main supporting frame, a bag retaining magazine mounted on said frame, bag carrying means movably supported on said frame, bag feeding means adapted to feed individual bags from said magazine to said bag carrying means, cylically operable means for first moving said bag carrying means in a single horizontal direction to place a bag held thereby in registry with the bag engaging devices of the associated filling machine and for then raising said bag carrying means vertically to thereby apply the bag to said associated filling machine, and means disposed in cooperative relation to said bag feeding means for ejecting multiple bags presented thereto.

28. In an automatic bag feeding machine adapted to supply bags individually to bag engaging devices of a filling machine associated therewith, a main supporting frame, a bag magazine mounted on said frame and adapted to hold a stack of bags placed therein, a bag selecting device associated with one end of said magazine and adapted to separate the end of the bottom bag from the stack, bag carrying means movably supported on said frame, bag feeding means engageable with the bag end thus separated and adapted to feed said bag from said magazine to said bag carrying means, cylically operable means for first moving said bag carrying means in a single horizontal direction to place the bag held thereby in registry with the bag engaging devices of the associated filling machine and for then moving said bag carrying means vertically to thereby apply the bag to said associated filling machine, and means disposed in cooperative relation to said bag feeding means for ejecting multiple bags presented thereto.

29. In an automatic bag feeding machine adapted to supply bags individually to bag engaging devices of a filling machine associated therewith, a main supporting frame, a bag retaining magazine mounted on said frame, opposed cooperatively disposed bag holding devices movably supported on said frame, bag feeding means adapted to feed individual bags from said magazine to said bag holding devices, means for imparting a movement of separation to said bag holding devices to at least partially open the mouth of a bag held thereby, and cylically operable means for bodily moving said bag holding devices jointly in a single horizontal direction and jointly vertically to place the partially open bag in registry with and to apply the partially open bag to the bag engaging devices of said associated filling machine.

30. In an automatic bag feeding machine adapted to supply bags individually to bag engaging devices of a filling machine associated therewith, a main supporting frame, a bag retaining magazine mounted on said frame, opposed cooperatively disposed bag holding devices movably supported on said frame, bag feeding means adapted to feed individual bags from said magazine to said bag holding devices, means for imparting a movement of separation to said bag holding devices to at least partially open the mouth of a bag held thereby, and cylically operable means for first moving said bag holding devices in a single horizontal direction to place the bag held thereby in registry with the bag engaging devices of the associated filling machine and for then moving said bag holding devices vertically to thereby apply the bag to said associated filling machine.

31. In an automatic bag feeding machine adapted to supply bags individually to bag engaging devices of a filling machine associated therewith, a main supporting frame, a bag retaining magazine mounted on said frame, opposed cooperatively disposed bag holding devices movably supported on said frame, bag feeding means adapted to feed individual bags from said magazine to said bag holding devices, means for imparting a movement of separation to said bag holding devices to at least partially open the mouth of a bag held thereby, means for first moving said bag holding devices horizontally to place the bag held thereby in registry with the bag engaging devices of the associated filling machine and for then moving said bag holding devices vertically to thereby apply the bag to said associated filling machine, means for disengaging said bag holding devices from the bag, and means for imparting an additional movement of separation to said bag holding devices subsequent to disengagement thereof from said bag whereby said bag holding devices will not contact the bag during return movement of said bag holding devices.

HOWARD G. ALLEN.